(12) United States Patent
Tanikawa et al.

(10) Patent No.: US 7,082,915 B2
(45) Date of Patent: Aug. 1, 2006

(54) RESIN INTAKE MANIFOLD

(75) Inventors: Hironori Tanikawa, Obu (JP); Makoto Fujimori, Obu (JP); Kazuhiro Aiki, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 17 days.

(21) Appl. No.: 10/811,844

(22) Filed: Mar. 30, 2004

(65) Prior Publication Data
US 2004/0194750 A1    Oct. 7, 2004

(30) Foreign Application Priority Data

Apr. 7, 2003 (JP) ............................. 2003-102801
Apr. 8, 2003 (JP) ............................. 2003-104306
Apr. 8, 2003 (JP) ............................. 2003-104421

(51) Int. Cl.
*F02M 35/10* (2006.01)

(52) U.S. Cl. ........................ 123/184.42; 123/184.57; 123/184.61

(58) Field of Classification Search ........... 123/184.42, 123/184.57, 184.61
See application file for complete search history.

(56) References Cited

U.S. PATENT DOCUMENTS 4,867,110 A * 9/1989 Distelrath .............. 123/184.42

| | | | |
|---|---|---|---|
| 6,041,748 A | 3/2000 | Mueller et al. | |
| 6,205,968 B1 | 3/2001 | Spannbauer | |
| 6,328,011 B1 | 12/2001 | Jessberger et al. | |
| 6,340,011 B1 | 1/2002 | Jainek | |
| 2002/0020382 A1 | 2/2002 | Leipelt et al. | |
| 2002/0088423 A1 * | 7/2002 | Minegishi et al. ..... | 123/184.55 |

FOREIGN PATENT DOCUMENTS

| EP | 1 122 410 A2 | | 8/2001 |
|---|---|---|---|
| JP | 2000-179419 | | 6/2000 |
| JP | 2002147299 A | * | 5/2002 |
| KR | 332954 B | * | 4/2002 |

* cited by examiner

*Primary Examiner*—Noah P. Kamen
(74) *Attorney, Agent, or Firm*—Rader, Fishman & Grauer PLLC

(57) ABSTRACT

A resin intake manifold is provided with an integrally formed base member. The base member has a U-shaped curved distribution passage lower surface wall portion, an engine mounting flange portion formed in one end of the distribution passage lower surface wall portion, and a surge tank peripheral wall portion formed in another end and a lower surface side of the distribution passage lower surface wall portion. A resonator peripheral wall portion is integrally formed in a dead space in a lower surface side of the distribution passage lower surface wall portion and between the surge tank peripheral wall portion and the engine mounting flange portion. In accordance with the structure in which the wall itself constituting the resonator is formed by the structure member, it is possible to structure the resonator without enlarging a size of the intake manifold and without lowering the strength.

15 Claims, 24 Drawing Sheets

41(5)

4

RESIN INTAKE MANIFOLD

CROSS-REFERENCE TO RELATED APPLICATION

The present application claims priority to Japanese patent applications No. 2003-102801 filed Apr. 7, 2003, No. 2003-104306 filed Apr. 8, 2003, and No. 2003-104421 filed April 8, the entirety of each is hereby incorporated into the present application by this reference.

BACKGROUND OF THE INVENTION (1) Field of the Invention

The present invention relates to a resin intake manifold, and more particularly to a resin intake manifold which is arranged between a cylinder head of an engine and a throttle body.

(2) Description of the Prior Art (i) Prior Art Relevant to First Aspect of the Present Invention In conventional, as a resin intake manifold, there has been known a structure in which a resonator serving as a resonant chamber is independently provided in a dead space within a surge tank, for the purpose of effectively utilizing the dead space (refer to, for example, Japanese Unexamined Patent Publication No. 11-229981).

However, in accordance with the prior art mentioned above, since the resonant chamber is formed by using a flat member, there is a problem that in the case that a great positive pressure is rapidly applied to an inner side of the surge tank due to a back fire or the like, a stress is concentrated and a strength is lowered.

(ii) Prior Art Relevant to Second Aspect of the Present Invention

As is well known, the intake manifold is arranged between the throttle body and the cylinder head of the engine, and is structured such as to have a function of evenly distributing the air fed from a side of the throttle body into a plurality of cylinders in a cylinder head of the engine. The intake manifold is formed by an aluminum material or a resin material for the purpose of weight saving, and is constituted by a surge tank reserving the air fed from the side of the throttle body, and a plurality of branch pipes distributing the air reserved in the surge tank into the respective cylinders. Each of the branch pipes is structured such that one end has a suction port and is connected to the surge tank, another end has a discharge port and is connected to the cylinder head of the engine, and an air passage is formed between the suction port and the discharge port.

In recent years, since a cost reduction and a complex shape are required, the intake manifold is frequently formed by the resin material. The resin intake manifold is formed so as to be separated into two pieces or three pieces, and the separated portions are generally bonded in accordance with a vibration welding so as to be integrally formed.

The vibration welding is carried out by overlapping a pair of welding flange portions formed in the separated portions so as to pressure weld by using a jig, and thereafter transversely vibrating the jig in a direction orthogonal to a pressure welding direction so as to weld the welding flange portion on the basis of a friction heat. The welding flange portion is formed so as to protrude to an outer side from a wall portion of the surge tank, and the intake manifold is formed by bonding the protruding portions to each other.

At this time, a stress is applied to the bonded portion obtained by the vibration welding by the rapid positive pressure applied to the inner portion of the surge tank due to a miss fire of the engine or the like. When the stress becomes greater, the bonded portion tends to be broken. Accordingly, there can be considered that a pressure resisting shape is formed by increasing a thickness of a wall portion in the surge tank, however, since a weight is increased at a degree that the thickness is increased, this structure is not preferable.

Further, in the case that the thickness of the wall portion in the surge tank is increased, since thickening a side of an inner wall portion of the wall portion reduces a capacity of the surge tank, this structure is not preferable. Further, since thickening a side of an outer wall portion of the wall portion inversely makes the protruding portion of the welding flange portion narrow so as to make a pressure welding area of the jig small, the welding force is reduced, and a welding efficiency is lowered.

(iii) Prior Art Relevant to Third Aspect of the Present Invention

Nowadays, in view of the weight saving or the like, a resin intake manifold injection molded by a synthetic resin is going to be put on the market.

Accordingly, there is a resin intake manifold provided with a surge tank portion, an even number of intake pipes branched from the surge tank portion and connected to respective cylinders, and mounting flange portions formed in leading end portions of the intake pipes and connected to a cylinder head (refer to, for example, Japanese Unexamined Patent Publication No. 2000-179419).

Further, the resin intake manifold is mounted to the cylinder head via the mounting head at a connecting position provided on a diagonal line in the periphery of each of the cylinders, as described in Japanese Unexamined Patent Publication No. 2000-179419. In other words, for example, in the case of four cylinders, the connecting position appears in a zigzag shape, that is, near side→far side→near side→far side.

Further, in general, in a state in which each of bolt holes formed in the mounting flange is inserted through by a stud bolt protruding from a seat surface of the cylinder head and arranged in a zigzag shape, the mounting flange and the seat surface of the cylinder head are connected by fastening a nut.

At a time of the fastening work of the nut, there is a risk that the bolt drops from a gap formed between the intake pipes. In particular, in the case of mounting at the far side position, a mounting workability is not good, and there is a risk that the bolt drops during the mounting work.

In the case that the intake manifold is formed by a resin material with high water absorbability such as a polyamide 6 or the like, there is a risk that the intake manifold hygroscopic swells. Further, in the case of being in contact with a snow melting agent (a calcium chloride solution) for a long time, there is a risk that a stress crack caused by a metal salt is generated.

SUMMARY OF THE INVENTION (i) First Aspect of the Present Invention

An object of a first aspect of the present invention is to provide a resin intake manifold which can solve the problems of the prior art mentioned in the item (i) mentioned above, does not generate an enlarged scale, and can improve a strength.

In accordance with the first aspect of the present invention, there is provided a resin intake manifold, wherein a resonator is provided as a structure body in a dead space between a surge tank and an engine mounting flange. In accordance with the resin intake manifold, since the resonator is provided in the dead space of the intake manifold, it is possible to effectively utilize the dead space without generating any enlarged scale of the intake manifold, and further, since the resonator is provided as the structure body, it is possible to improve the strength of the intake manifold.

Further, in accordance with the first aspect of the present invention, there is provided another resin intake manifold comprising:

an integrally formed base member having a U-shaped curved distribution passage lower surface wall portion, an engine mounting flange portion formed in one end of the distribution passage lower surface wall portion, and a surge tank peripheral wall portion formed in another end and a lower surface side of the distribution passage lower surface wall portion, wherein a resonator peripheral wall portion is integrally formed in a dead space in a lower surface side of the distribution passage lower surface wall portion and between the surge tank peripheral wall portion and the engine mounting flange portion. In accordance with the resin intake manifold, since the resonator peripheral wall portion is integrally formed in the dead space between the surge tank peripheral wall portion and the engine mounting flange portion, it is possible to effectively utilize the space without generating any enlarged scale of the base member, and further, since the resonator peripheral wall portion is integrally formed in the lower surface of the distribution passage lower surface wall portion, it is possible to improve a strength of the distribution passage lower surface wall portion, in other words, a strength of the base member.

In this case, the structure may be made such that a part of the resonator peripheral wall portion and a part of the surge tank peripheral wall portion form a common wall portion. In accordance with this structure, since the other wall portions than the common wall portion in the resonator peripheral wall portion function as a reinforcing structure of the surge tank peripheral wall portion, it is possible to improve a strength of the surge tank peripheral wall portion in addition to the distribution passage lower surface wall portion.

Further, the structure may be made such that the resin intake manifold is provided with a tank lower surface wall and resonator peripheral wall member welded to a lower surface side of the base member, and a lower cover member welded to an opening portion in a lower surface side of the tank lower surface and resonator peripheral wall member, the tank lower surface wall and resonator peripheral wall member and the lower cover member have respective separation passages, and a communication passage communicating between the resonator and the surge tank is formed by a combination of both the separation passages. In accordance with this structure, it is unnecessary to use a slide core or the like and it is extremely easy to carry out a work for forming the communication passage, in comparison with the case that the communication passage is formed only by one member.

Further, the structure may be made such that a long hole in a vertical direction is provided in an opening end of the communication passage in a side of the surge tank, and the communication passage is communicated with an upper portion of the long hole. In accordance with this structure, since it is possible to receive a dew condensation within the surge tank or within the resonator by a lower portion of the long hole so as to keep the communication state between upper portion of the long hole and the communication passage, at a time of being used in a cold district or the like, it is possible to maintain the communication state between the surge tank and the resonator, and it is possible to maintain a function (a noise reduction and an output torque increase) of the resonator.

(ii) Second Aspect of the Present Invention

An object of a second aspect of the present invention is to provide a resin intake manifold which can solve the problems of the prior art mentioned in the item (ii) mentioned above and can reduce a stress applied to the weld flange portion without increasing a thickness of the surge tank.

In accordance with the second aspect of the present invention, there is provided a resin intake manifold provided with a surge tank arranged between a throttle body and an engine and reserving an air, and a plurality of branch pipes each having a discharge port connected to each of cylinders of an engine in one end and forming an air passage, and evenly distributing the air to each of the cylinders of the engine, wherein air passage center positions of a plurality of branch pipes are arranged in a curved shape so as to make the air passage center position of the inner branch pipe high, in a cut surface passing through the surge tank, and a wall portion of the surge tank in an opposite surface to the branch pipe with respect to the surge tank is formed in a curved shape expanded in a center portion. In accordance with the resin intake manifold, even in the case that the rapid positive pressure is generated within the surge tank due to a back fire or the like, and the pressure is applied to an inner wall surface of the surge tank, since the inner wall surface of the surge tank, that is, the inner peripheral wall surface in the side of the branch pipe on the one hand, and the inner peripheral wall surface in the opposite side to the branch pipe on the other is formed in an approximately oval cross sectional shape of the curved surface so as to expand the center portion, the surge tank is hard to be deformed due to the internal pressure and it is possible to make an amount of deformation extremely small. In other words, since the curved inner wall surface is similar to the conventional state in which the linear inner wall surface is expanded in the center portion due to the high internal pressure, it is possible to reduce a stress concentration by forming the inner wall surface so as to be expanded in the center portion. Accordingly, it is possible to make a new deformation minimum, and it is possible to provide a resin intake manifold having a pressure resisting shape. Further, it is possible to form the branch pipes such that all the branch pipes have an equal length, by arranging the air passage center positions of the respective branch pipes in the curved shape so as to make the air passage center position of the inner branch pipe higher in a plurality of parallel arranged branch pipes. In other words, since it is necessary to form each of the branch pipes so as to evenly supply the air to each of the cylinders of the engine, it is necessary that a distance between the surge tank and each of the cylinders is formed at the same length. In the case of forming the intake manifold by the resin, a plurality of branch pipes arranged in parallel in a plan view are extended from the suction port connected to the surge tank so as to expand toward the discharge port connected to each of the cylinders. In this case, since the branch pipe arranged in an outer side is generally formed in a large curved shape in a lateral direction between the surge tank and the cylinder, the distance thereof becomes long, and since the inner branch pipe is formed in a small curved shape in the lateral direction or a linear shape, there is a tendency that the length thereof can not be increased. However, it is possible to set the inner branch pipe to the same length as that of the length of the outer branch pipe by arranging the inner branch pipe higher in a vertical direction (arranging the inner branch pipe in a curved shape such that an inner side is expanded).

Accordingly, it is possible to form the pressure resisting structure by forming the arrangement of a plurality of branch pipes in the curved shape such that the center position of the air passage of the inner branch pipe is higher in a plurality of branch pipes, and it is possible to set the length of a plurality of branch pipes to the same length without adding any new structure. Accordingly, it is possible to achieve an improvement of productivity as well as an improvement of the pressure resisting strength.

In this case, the structure may be made such that the surge tank is formed by three pieces separated by a separation part separating along a parallel arranging direction of the branch pipes in the surge tank and a separation part separating the branch pipes along the parallel arranging direction of the branch pipes, in a cut surface cutting a plurality of branch pipes and the surge tank, and is bonded in the respective separation parts in accordance with a vibration welding. In accordance with this structure, since the resin intake manifold can reduce the stress concentration as mentioned above, even in the structure which is formed by three pieces separated by the separation part separating the surge tank and the separation part separating the branch pipes, in the cut surface cutting a plurality of branch pipes and the surge tank, it is possible to make a bending stress small in the separated bonded portion which tends to be exposed to the stress concentration. Accordingly, it is possible to provide the resin intake manifold having the pressure resisting structure inexpensively without making the thickness of the surge tank large, for example, so as to make the capacity of the surge tank small, or without making the area of the pressure welding portion of the vibration welded portion small so as to lower a welding efficiency.

(iii) Third Aspect of the Present Invention

An object of the present invention is to provide a resin intake manifold which can solve the problems mentioned in the item (iii) mentioned above, has an improved screw fastening operability with respect to a cylinder head, can reduce a risk of a stress crack due to the hygroscopic swelling and the metal salt, and is easily formed by a mold.

In accordance with the present invention, there is provided a resin intake manifold provided with a surge tank portion, an even number of intake pipes branched from the surge tank portion so as to be connected to respective cylinders, and mounting flange portions formed in leading end portions of the intake pipes and connected to a cylinder head, wherein a connection between the mounting flange portions and the cylinder head is achieved by a screw connection, the mounting flange portions are provided with bolt holes, and a pair of ribs having a gap between a pair of ribs so as to prevent the screw member from falling off are formed between opposing walls of the intake pipes.

Since a pair of ribs are provided between the opposing walls of the intake pipes so as to prevent the screw member from falling off, there is no risk that a nut falls off, and a screw fastening operability of the nut or the like is improved. Further, no water stays owing to the gap formed between the ribs for preventing the nut from falling off, and the stress crack is hard to be generated due to the hygroscopic swelling or the calcium chloride.

In the structure mentioned above, the structure may be made such that the bolt holes provided in the mounting flange portions are arranged on a diagonal line with respect to the respective cylinder holes of the cylinder head, and a pair of ribs are formed in the opposing walls of the intake pipe in which the screw fastening is at a far side position. In accordance with this structure, the screw fastening operability is better, and an effect of the present invention is remarkable.

In the structure mentioned above, it is desirable that the gap between a pair of ribs is formed from the mounting flange portion toward the intake pipe and at least a terminal end wall of the gap between a pair of ribs is formed so as to be inclined in a die cutting direction of a female mold or so as to be over a back surface wall of the ribs. At a time of forming the base portion, the gap between a pair of ribs is short of undercut, the slide core for forming the gap between a pair of ribs is not required, and a productivity is improved.

In each of the structures mentioned above, it is desirable that a top surface of the rib for preventing the nut from falling off is formed in a shape corresponding to a water stream guide surface for guiding a water stream to the gap between a pair of ribs. The water is more rapidly discharged, and the hygroscopic swelling and the stress crack are harder to be generated.

It is desirable that the molding material of the intake manifold is normally constituted by a polyamide in which a polyamide density reinforced by an inorganic fiber is equal to or more than an approximately polyamide 6. Since the material has a high amide group concentration and is easy to generate the hygroscopic swelling and the stress crack, the operation and effect of the present invention are remarkable.

BRIEF DESCRIPTION OF THE DRAWINGS (i) FIGS. 1 to 19 show a first aspect of the present invention.

(ii) FIGS. 20 to 25 show a second aspect of the present invention.

Figure 20:
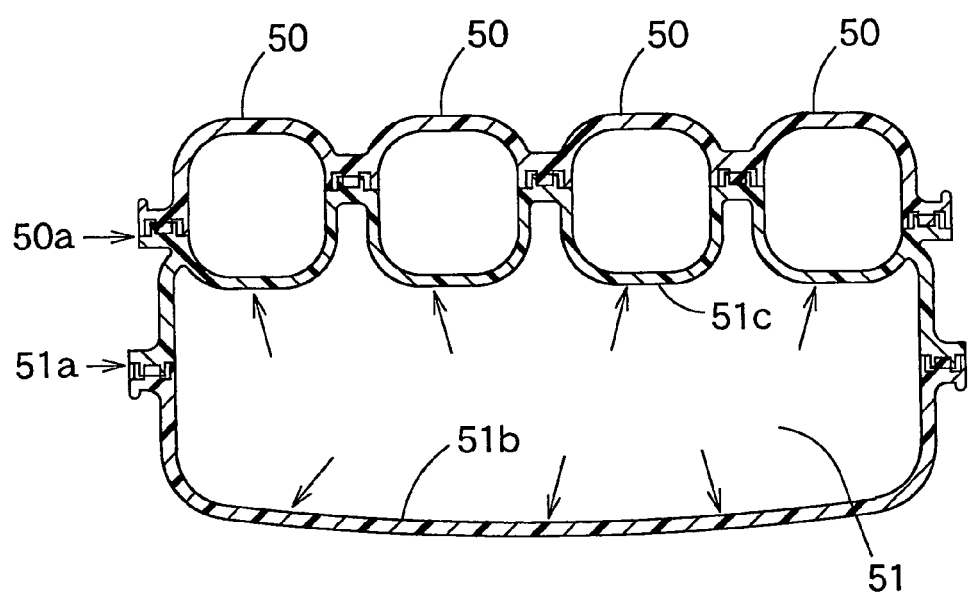
Figure 21:
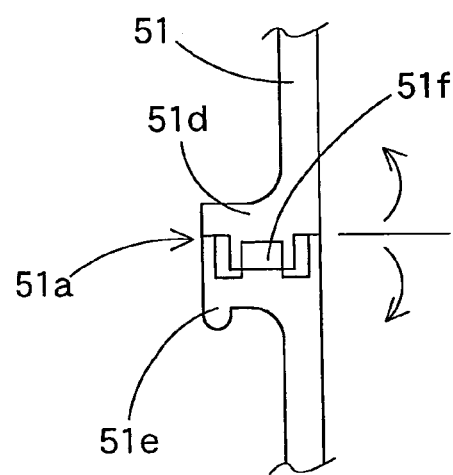
Figure 22:
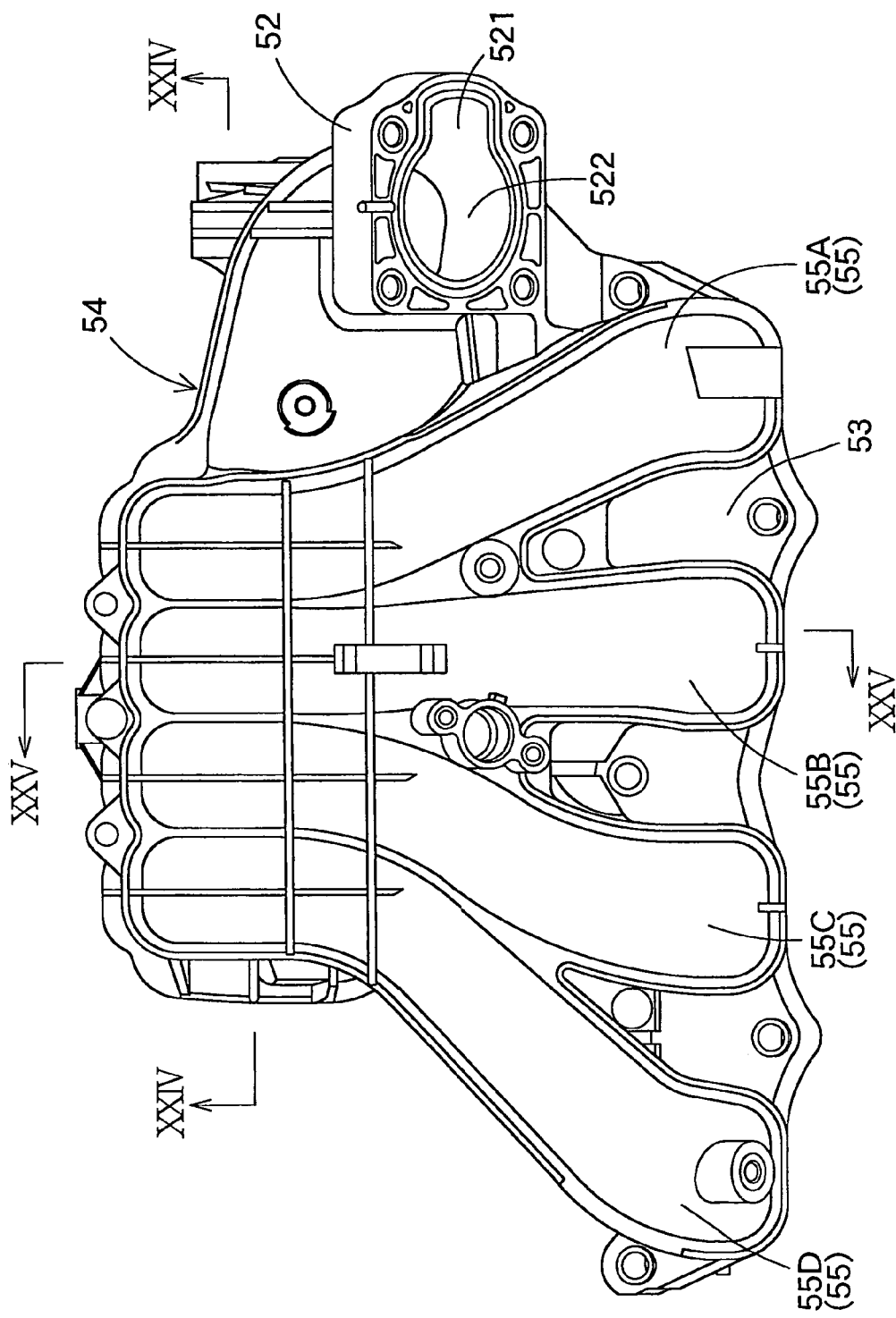
Figure 23:
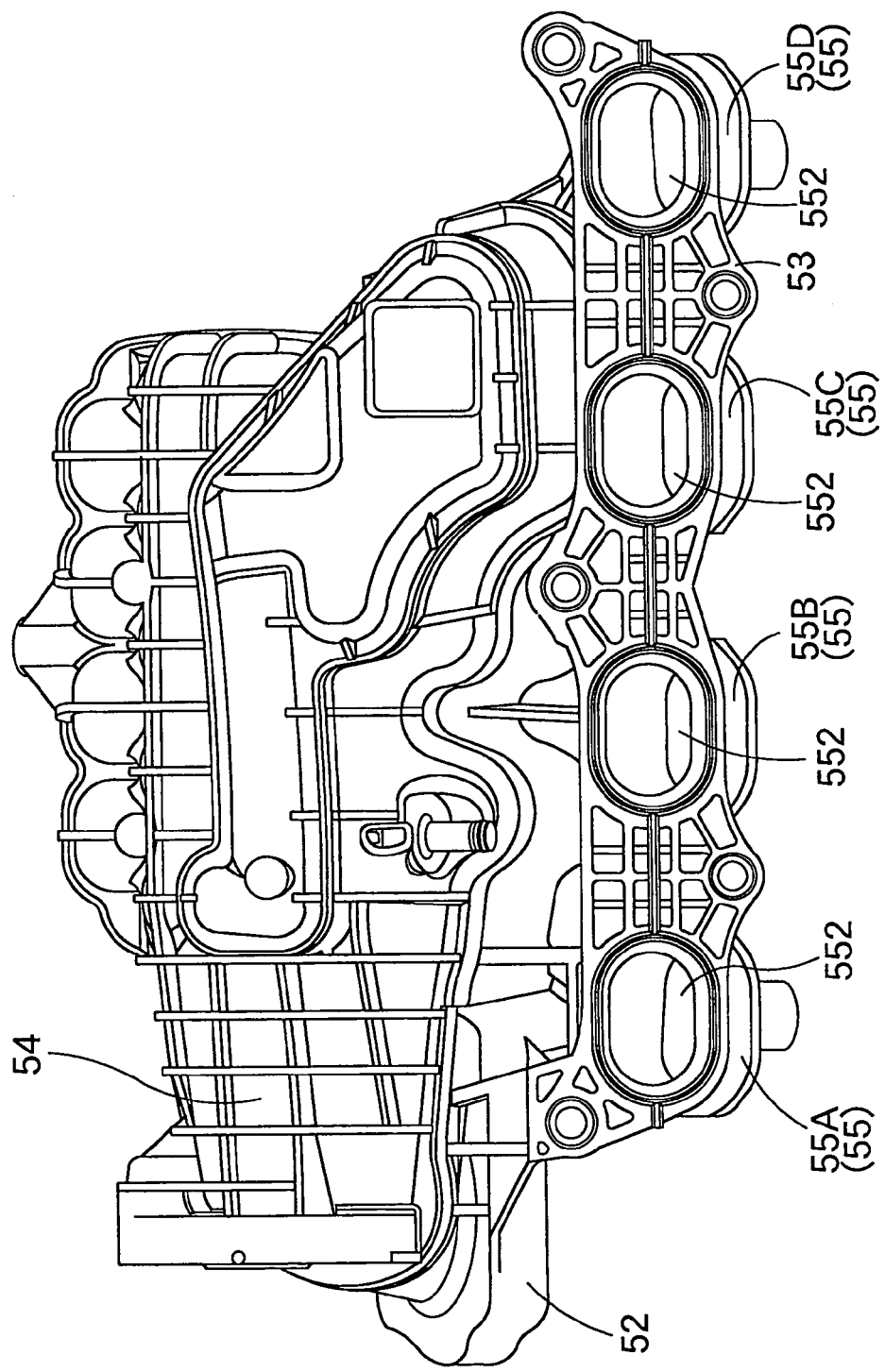
Figure 24:
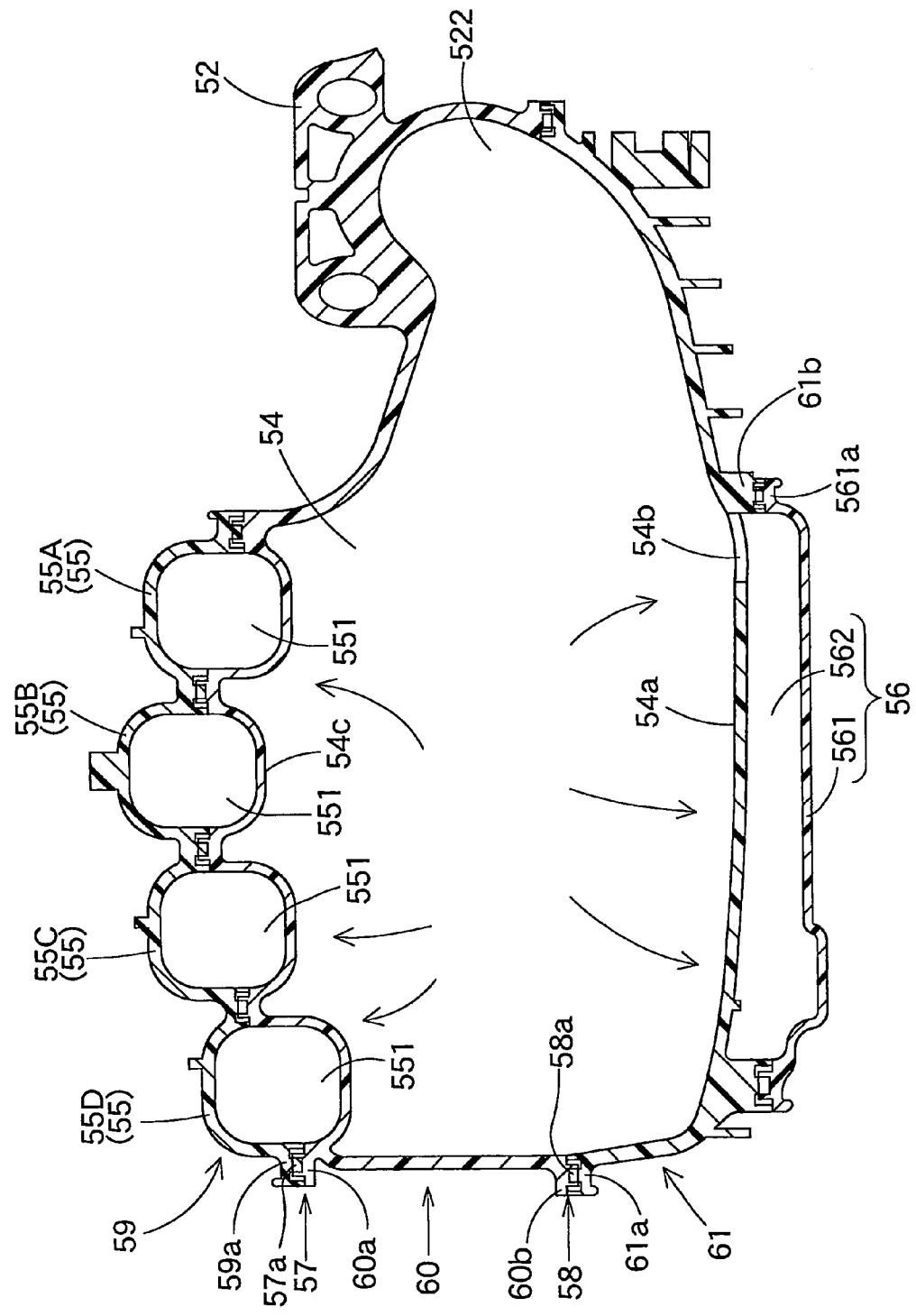

FIG. 20 is a cross sectional view showing a conventional intake manifold;

FIG. 21 is a partly enlarged cross sectional view showing a second separation surface in FIG. 20;

FIG. 22 is a plan view showing an intake manifold in accordance with an embodiment of a second aspect of the present invention;

FIG. 23 is a bottom elevational view of the same;

FIG. 24 is a cross sectional view along a line XXIV—XXIV in FIG. 22; and

Figure 25:
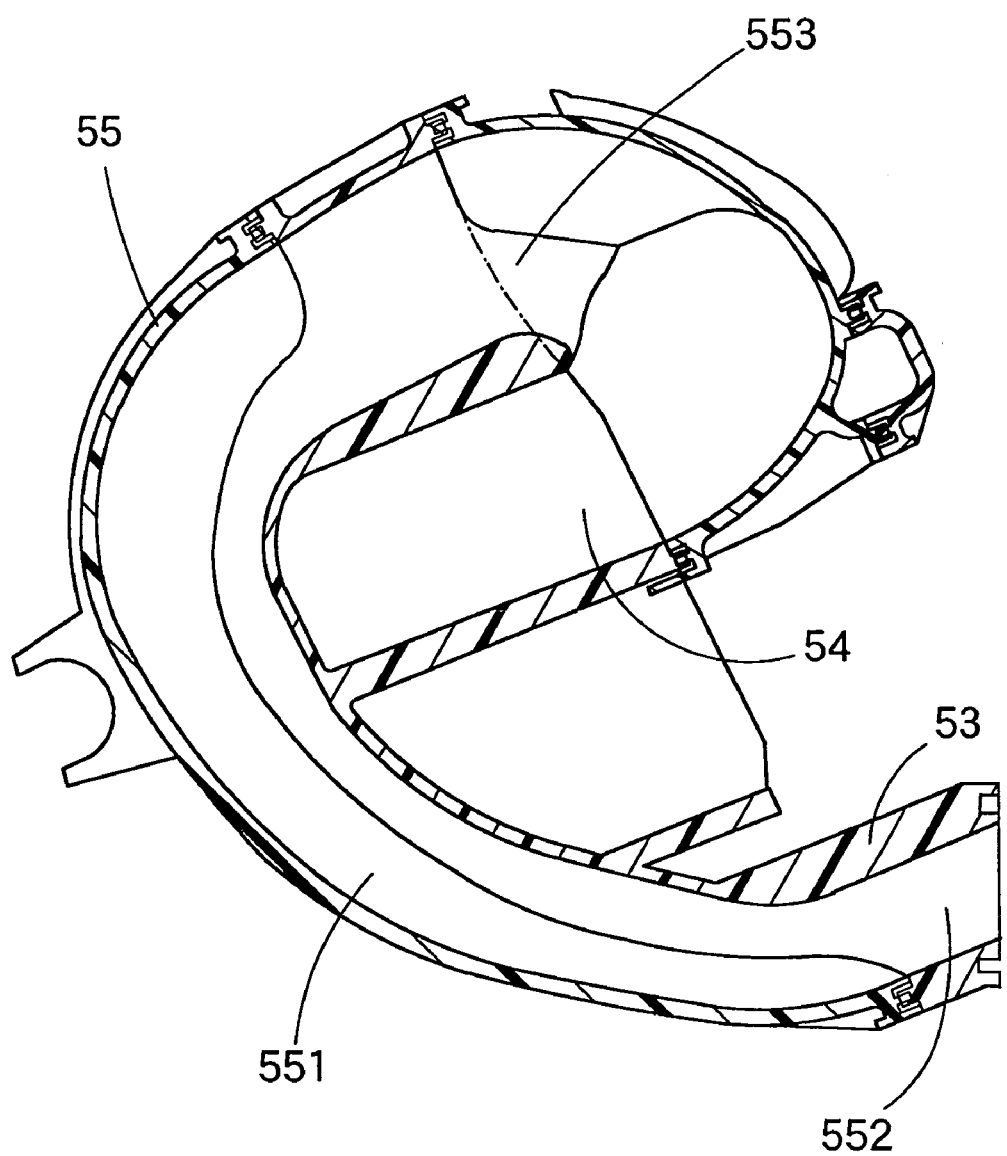

FIG. 25 is a cross sectional view along a line XXV—XXV in FIG. 22.

(iii) FIGS. 26 to 32 show a third aspect of the present invention.

Figure 26:
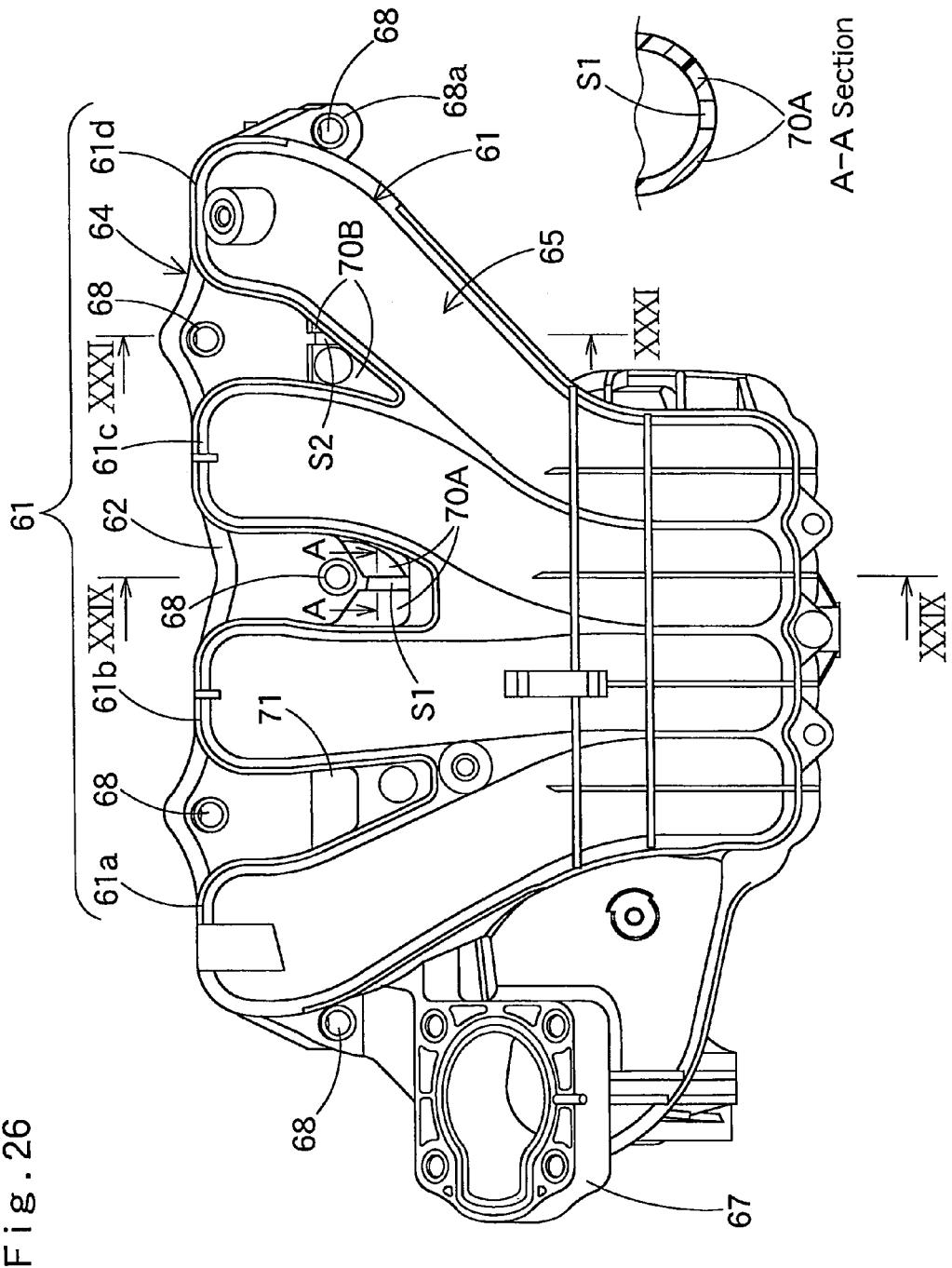
Figure 27:
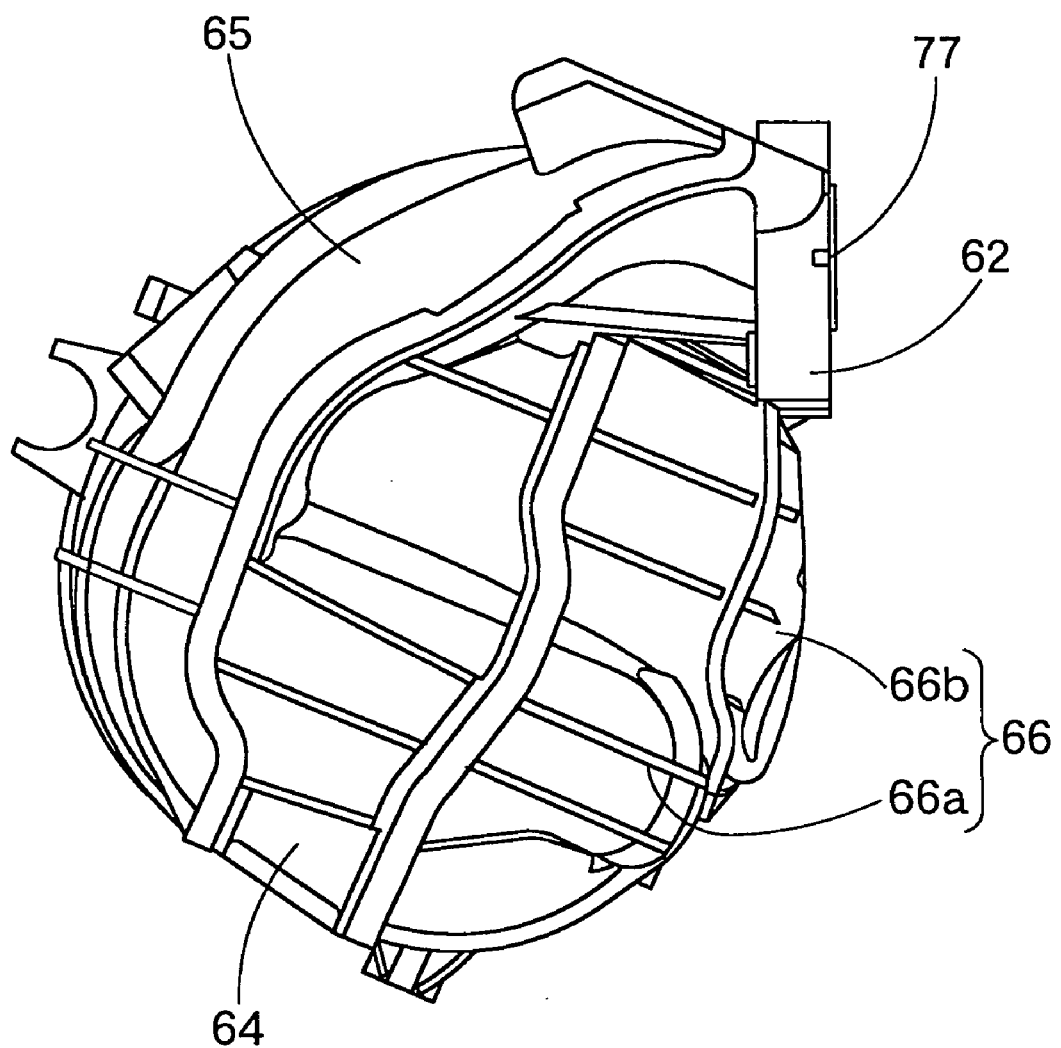
Figure 28:
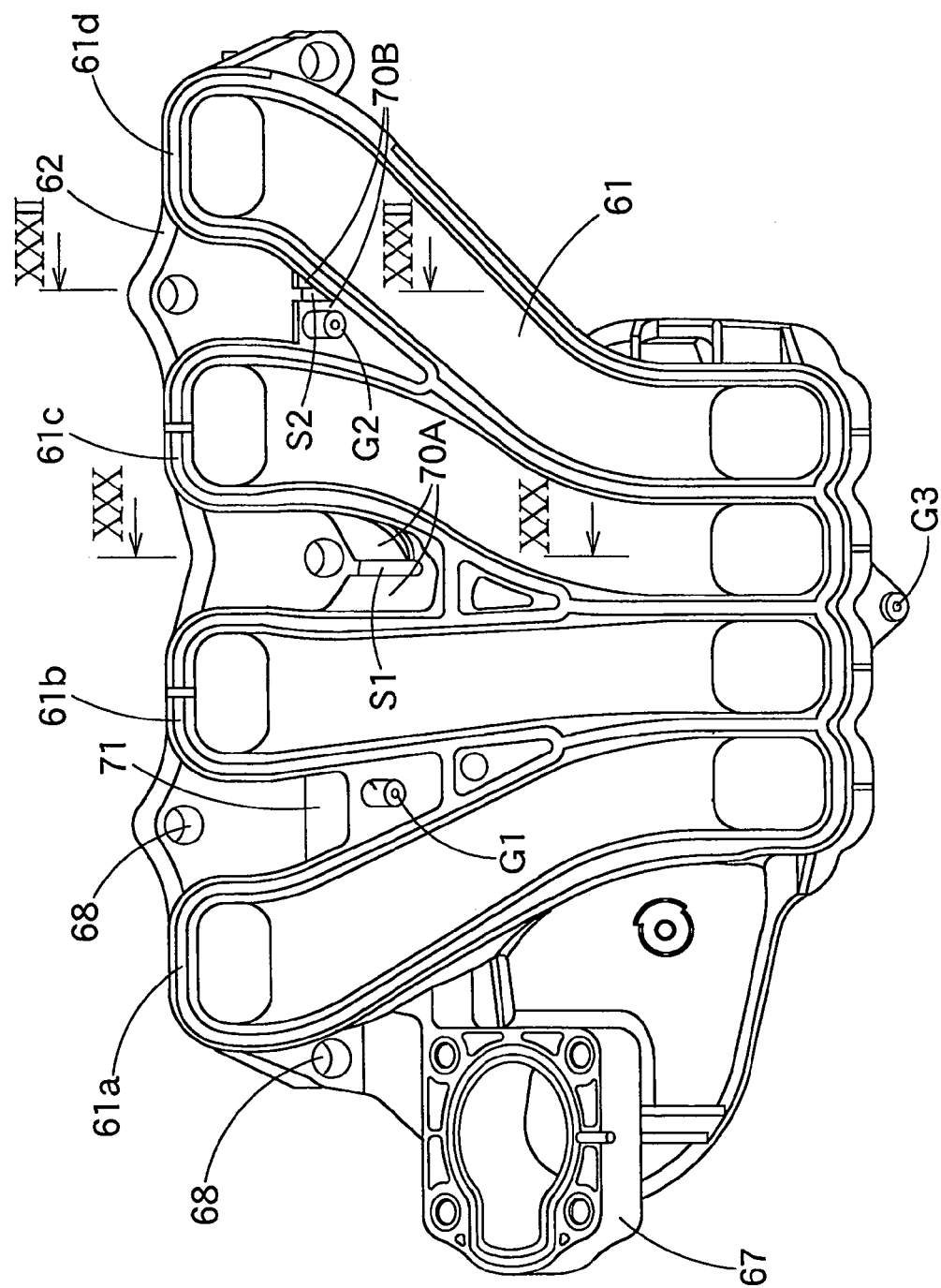
Figure 29:
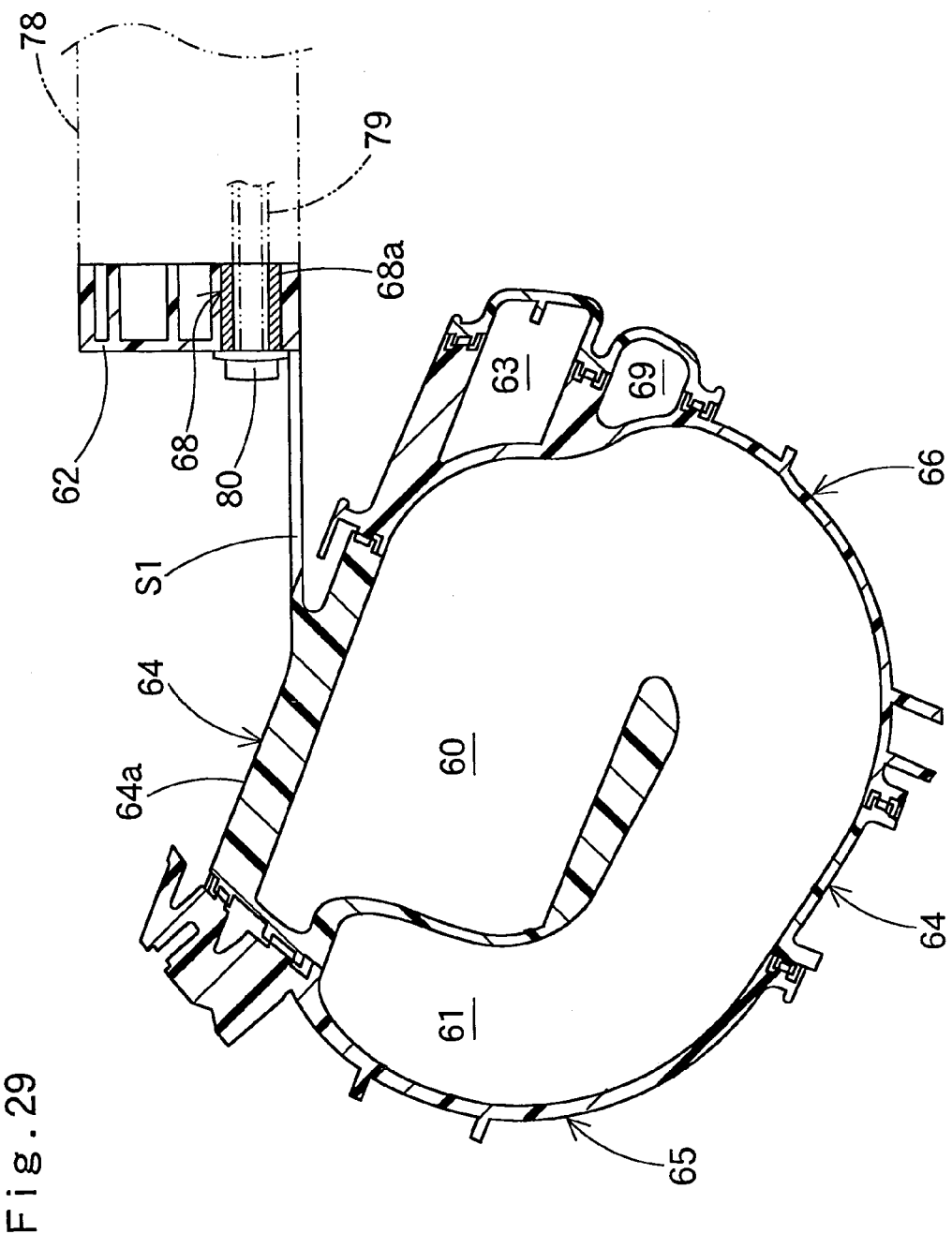
Figure 30:
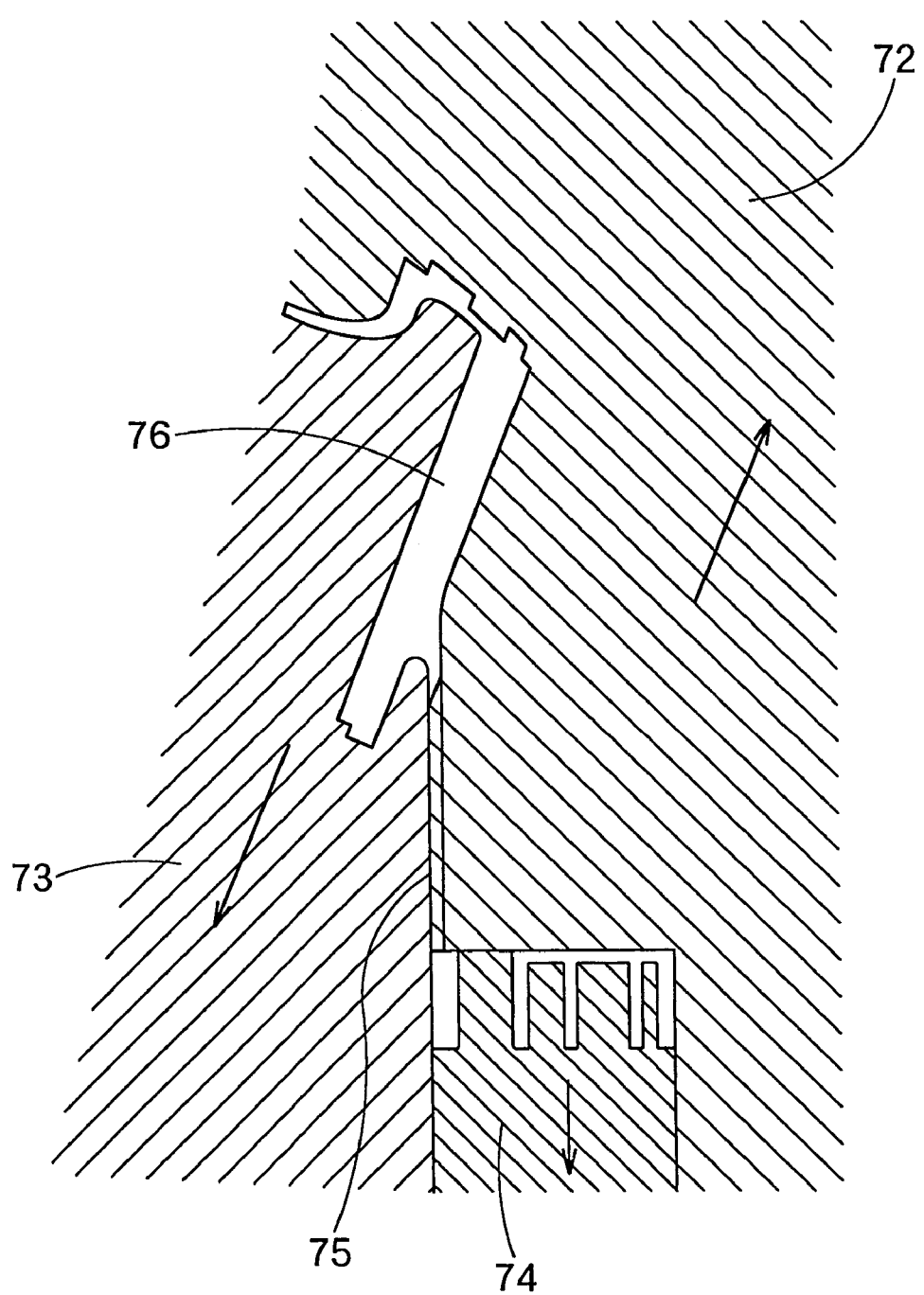
Figure 31:
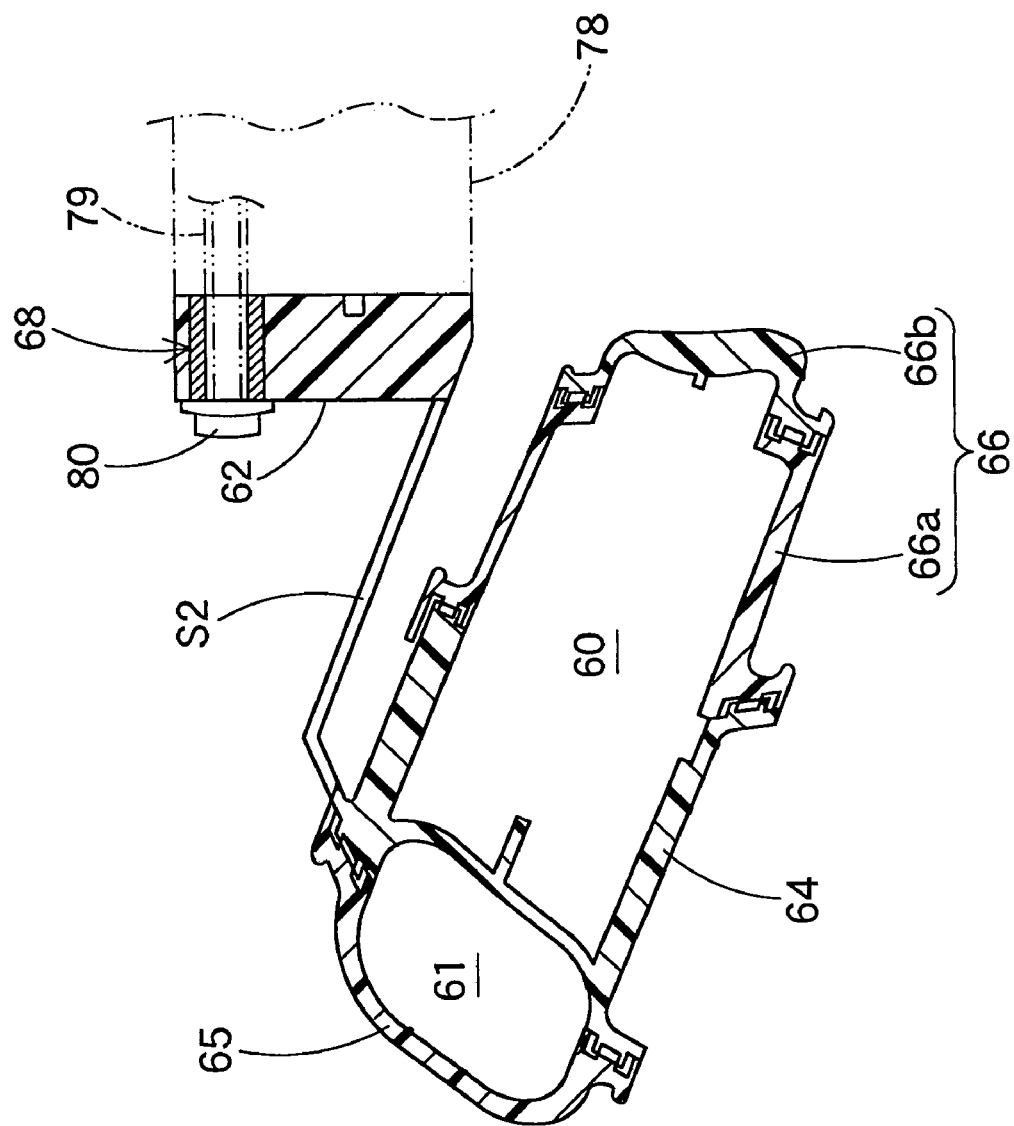
Figure 32:
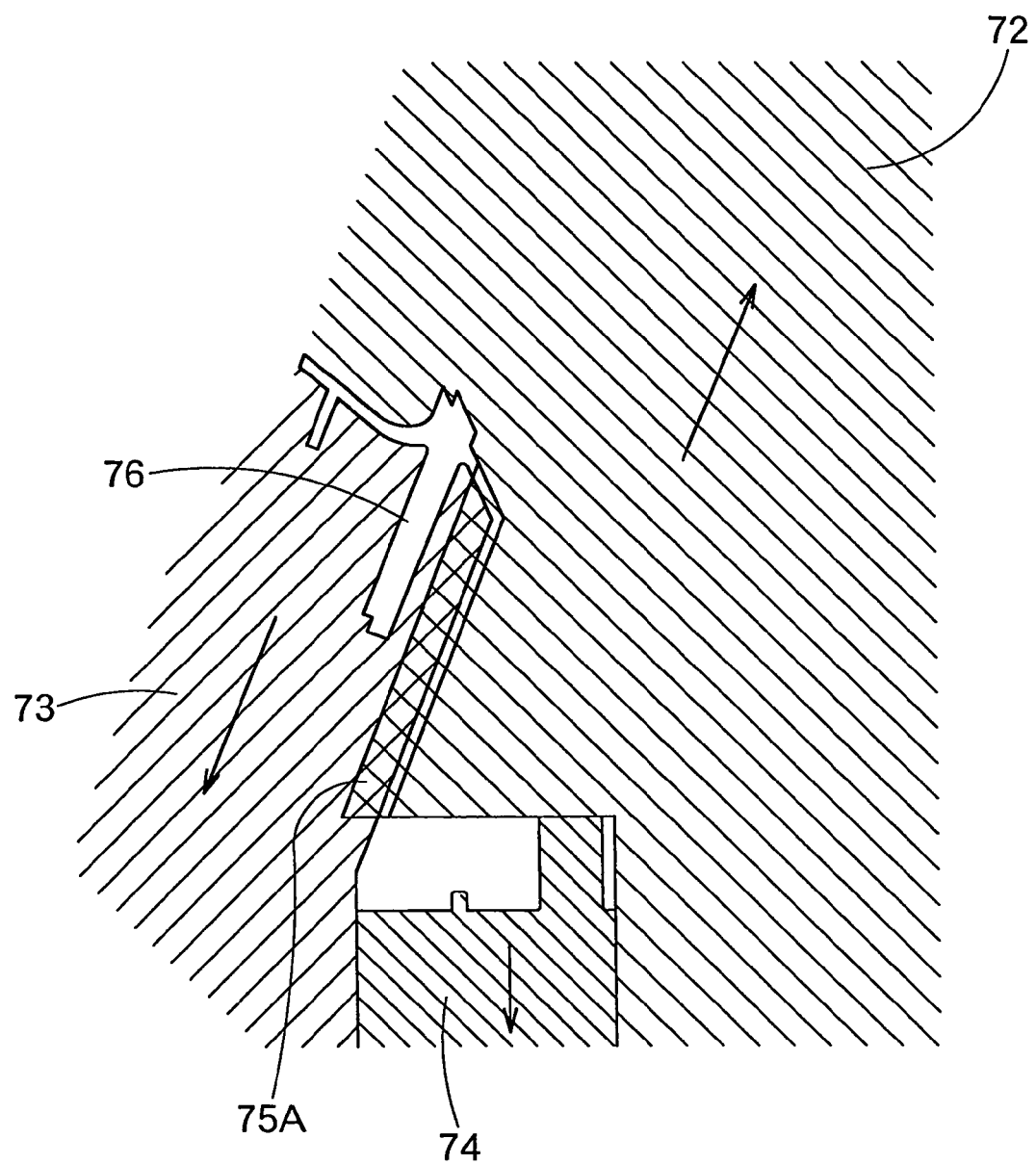

FIG. 26 is a front elevational view of a resin intake manifold in accordance with an embodiment of a third aspect of the present invention;

FIG. 27 is a left side elevational view of the intake manifold;

FIG. 28 is a back elevational view of the intake manifold;

FIG. 29 is a cross sectional view in which a rear surface is partly omitted in a portion along a line XXIX—XXIX in FIG. 26;

FIG. 30 is a cross sectional view in which a rear surface is partly omitted in a portion along a line XXX—XXX in FIG. 28;

FIG. 31 is a partly schematic cross sectional view of a molding metal mold corresponding to a portion along a line XXXI—XXXI in FIG. 26; and FIG. 32 is a cross sectional view of a main portion of the metal mold in a portion along a line XXXII—XXXII in FIG. 28.

Figure 1:
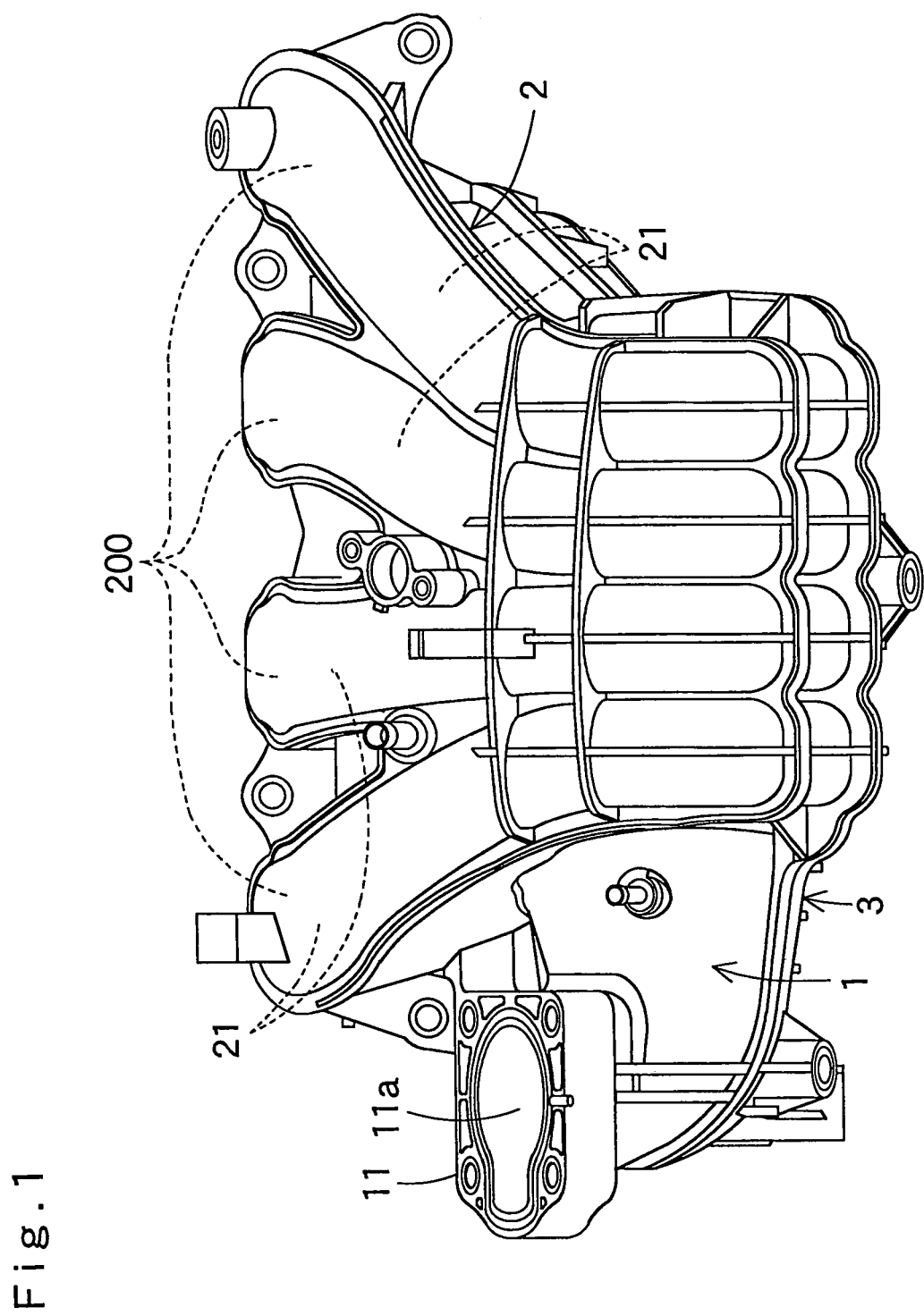
FIG. 1 is a front elevational view of a resin intake manifold in accordance with an embodiment of the first aspect of the present invention.
Figure 2:
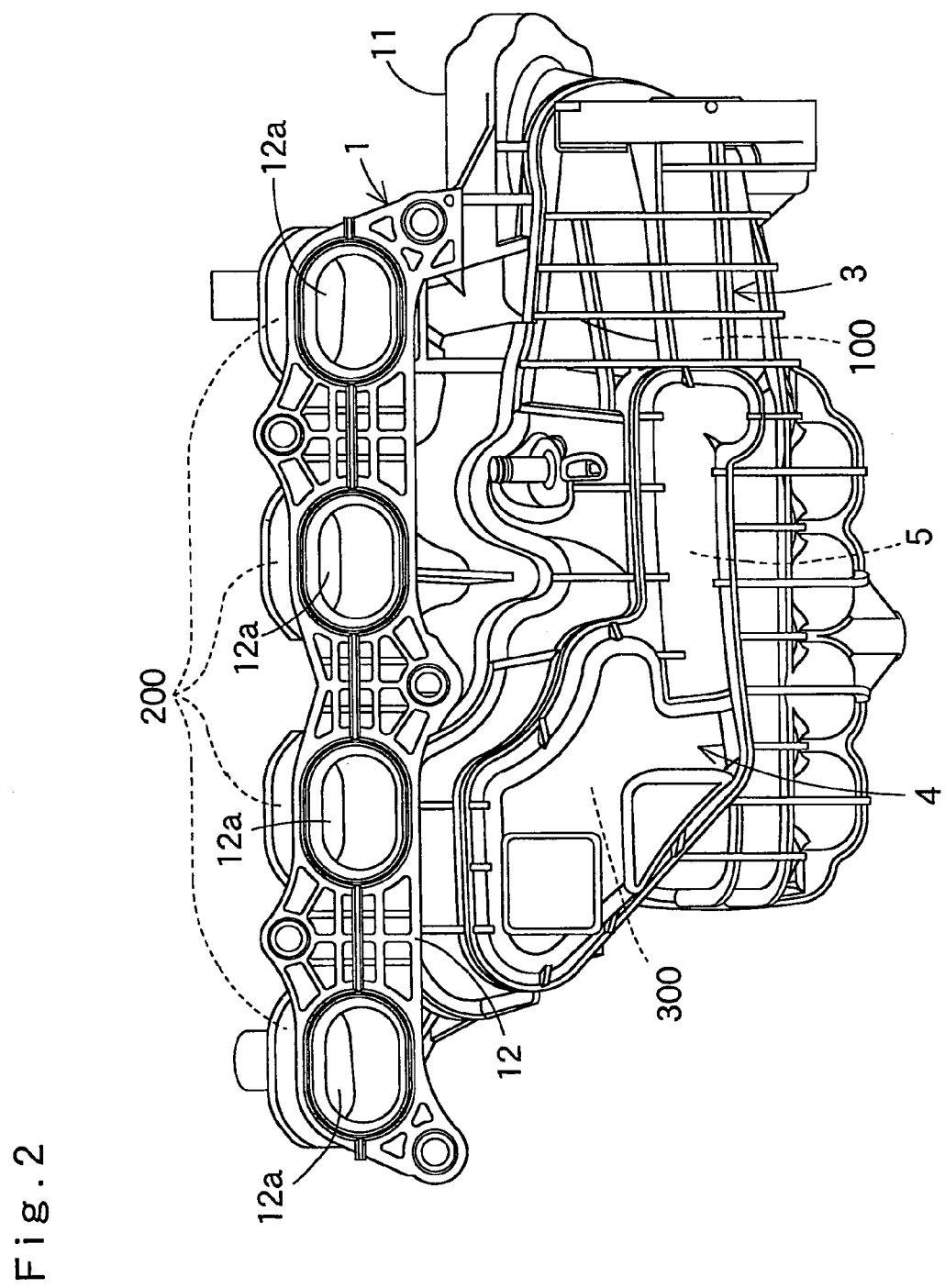
FIG. 2 is a back elevational view of the resin intake manifold.
Figure 3:
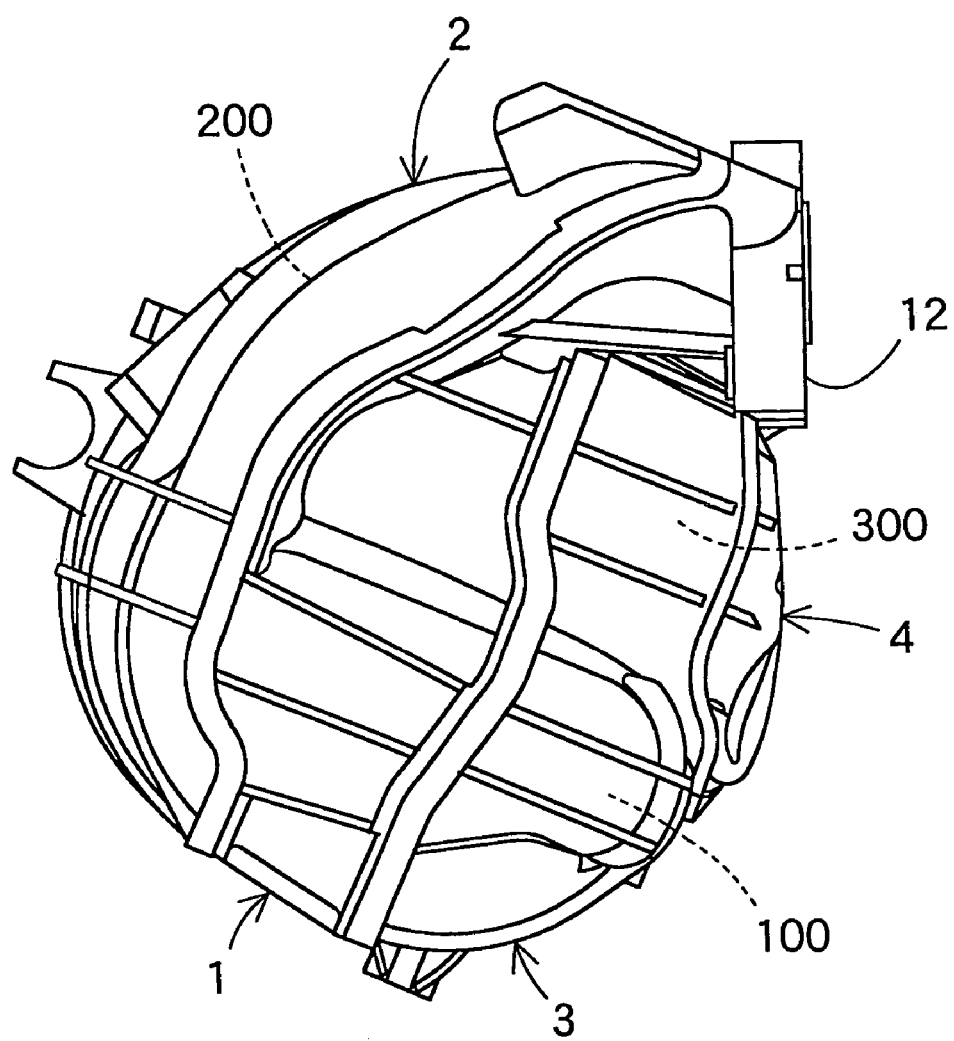
FIG. 3 is a right side elevational view of the resin intake manifold.
Figure 4:
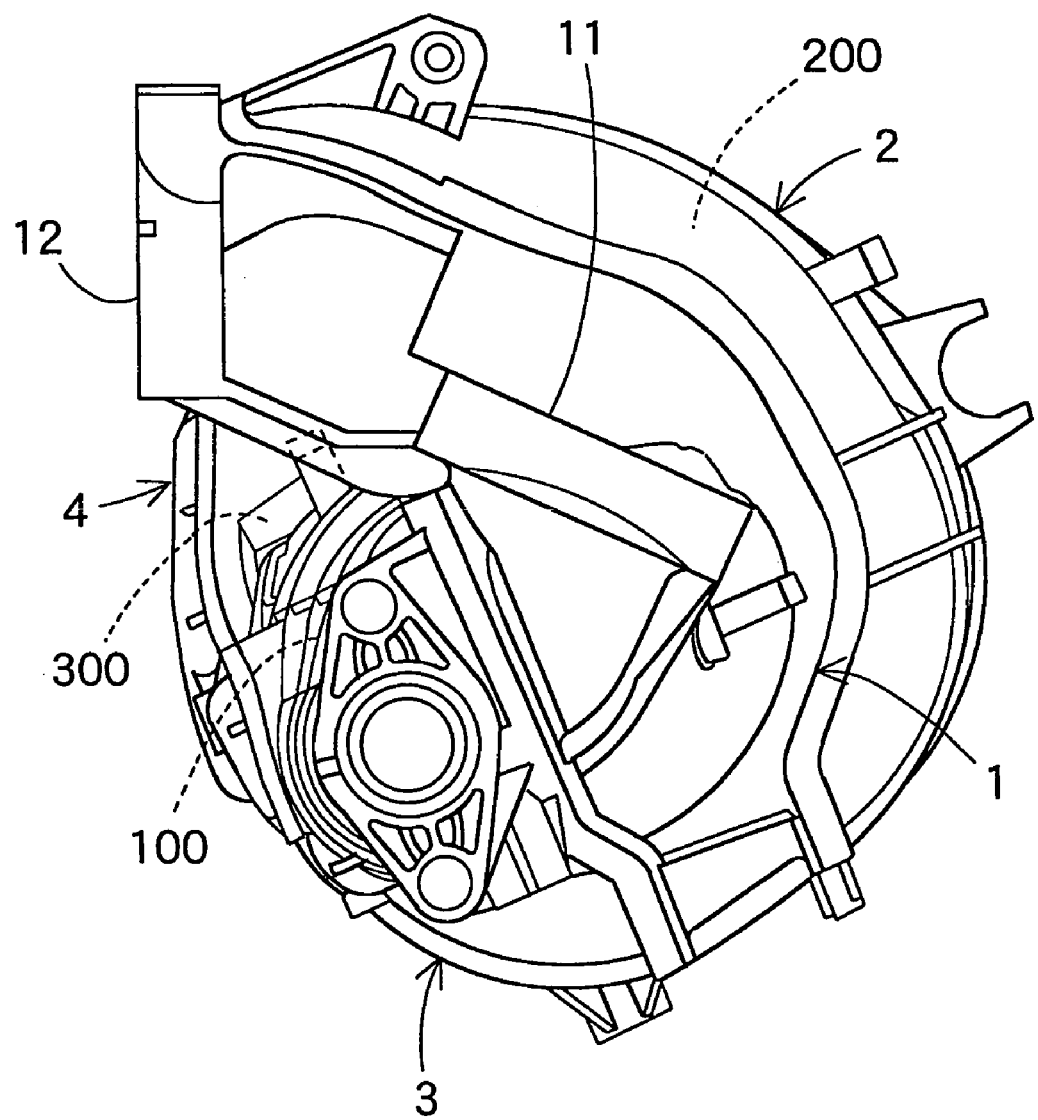
FIG. 4 is a left side elevational view of the resin intake manifold.
Figure 5:
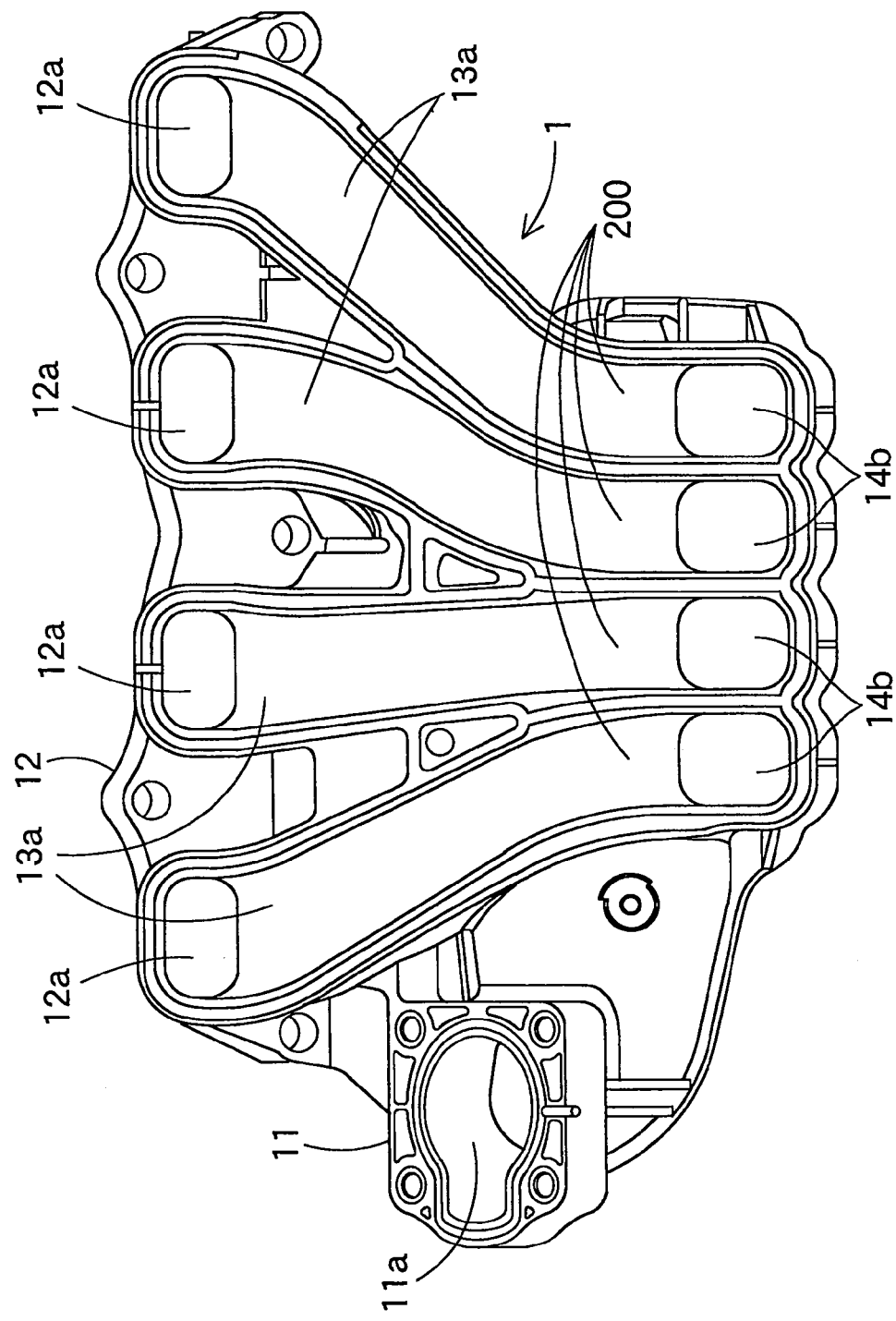
FIG. 5 is a front elevational view of a base member of the intake manifold.
Figure 6:
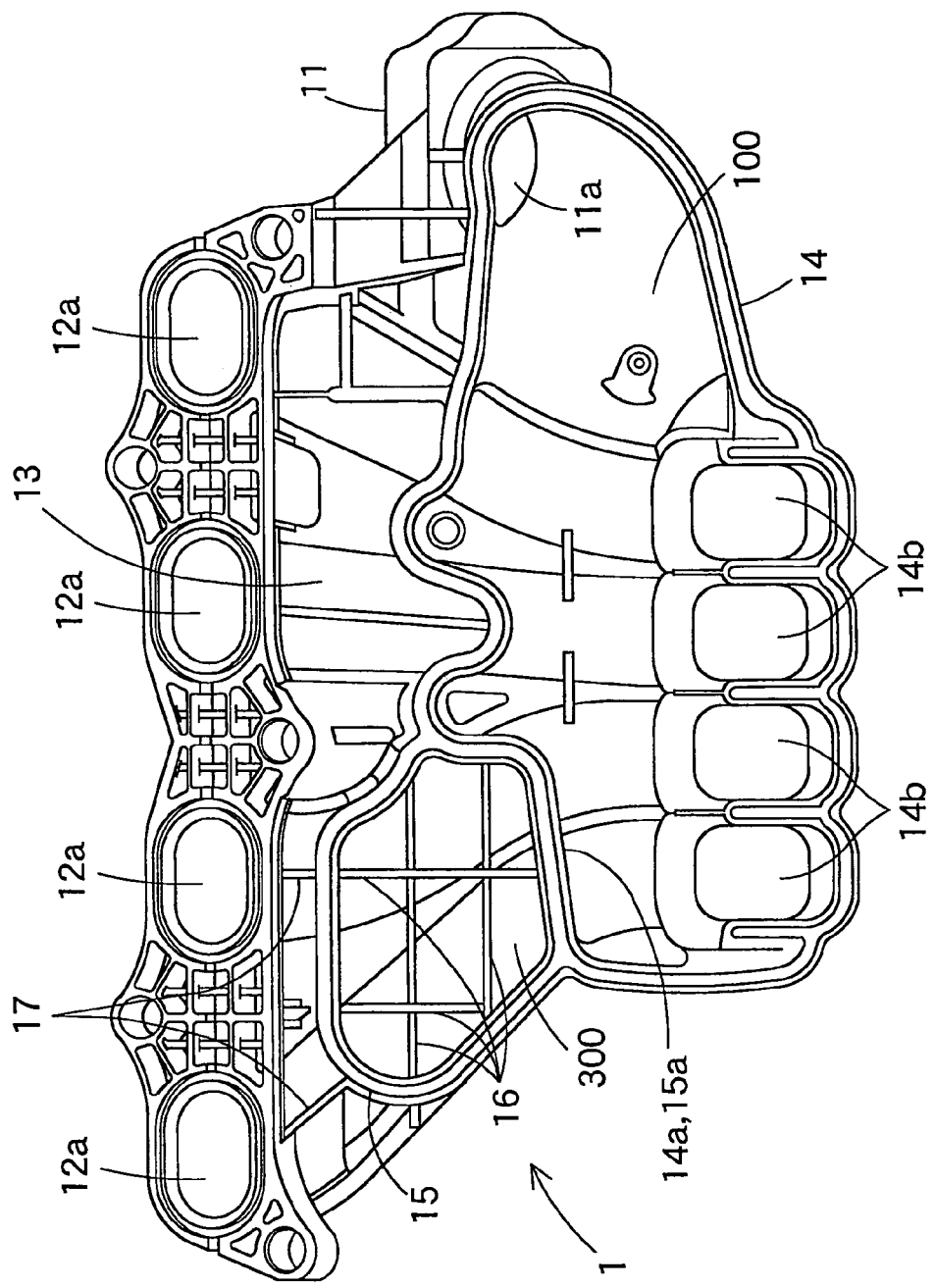
FIG. 6 is a back elevational view of the base member.
Figure 7:
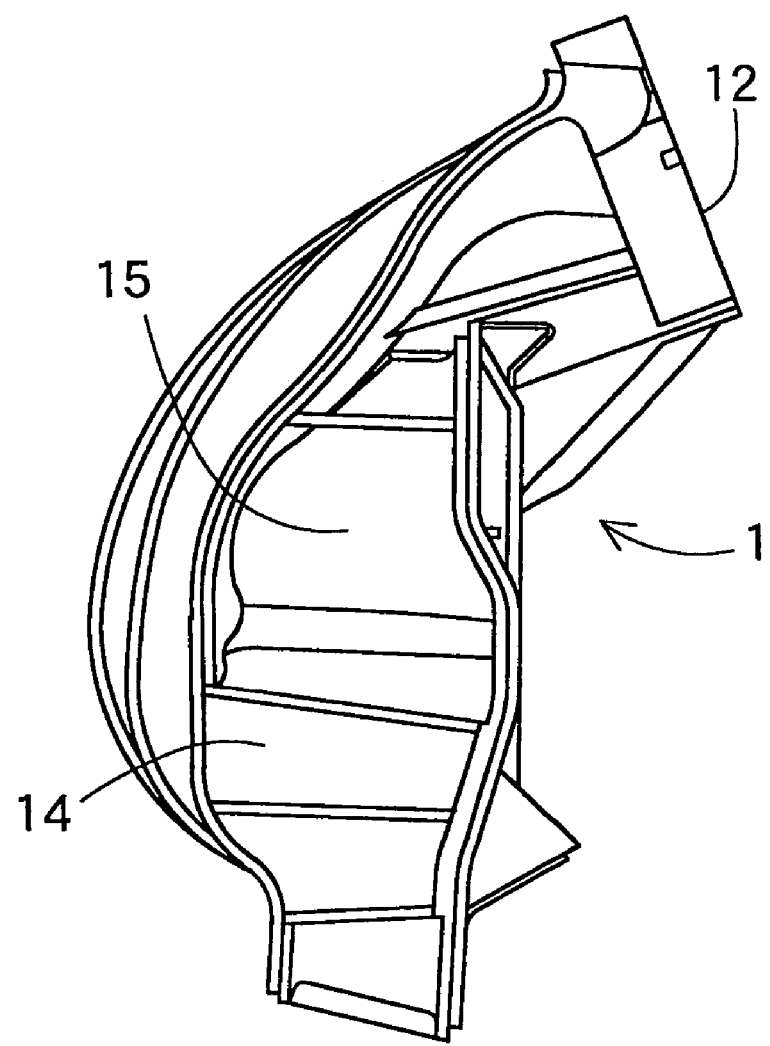
FIG. 7 is a right side elevational view of the base member.
Figure 8:
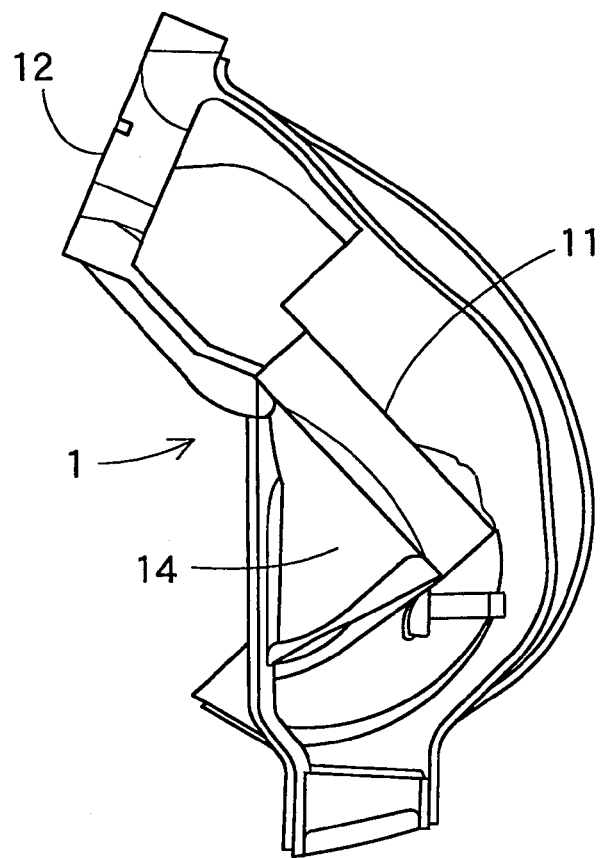
FIG. 8 is a left side elevational view of the base member.
Figure 9:
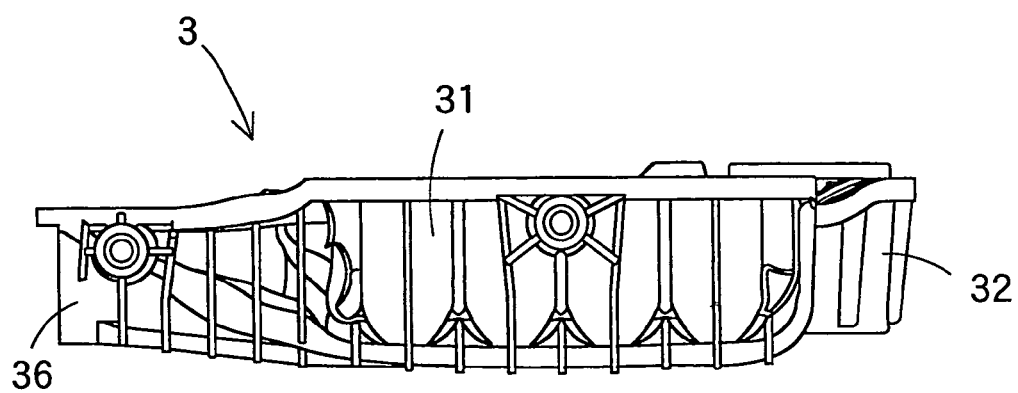
FIG. 9 is a front elevational view of a tank lower surface wall and resonator peripheral wall member.
Figure 10:
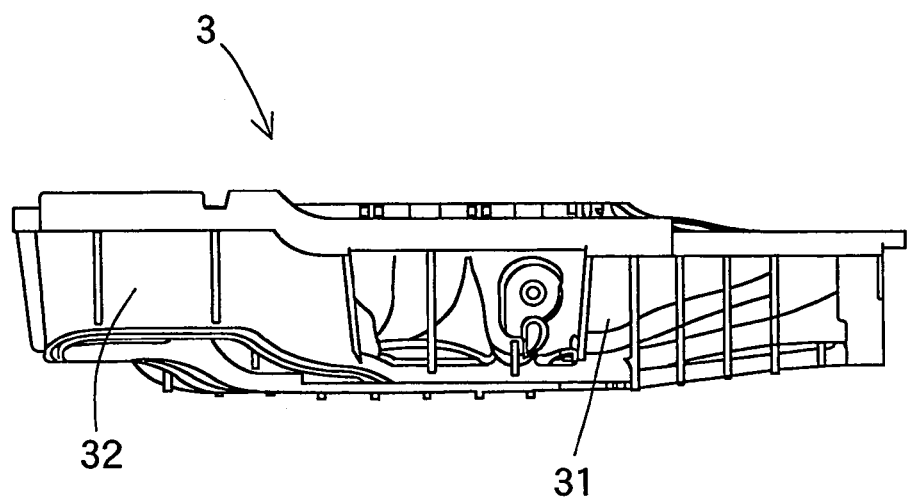
FIG. 10 is a back elevational view of the tank lower surface wall and resonator peripheral wall member.
Figure 11:
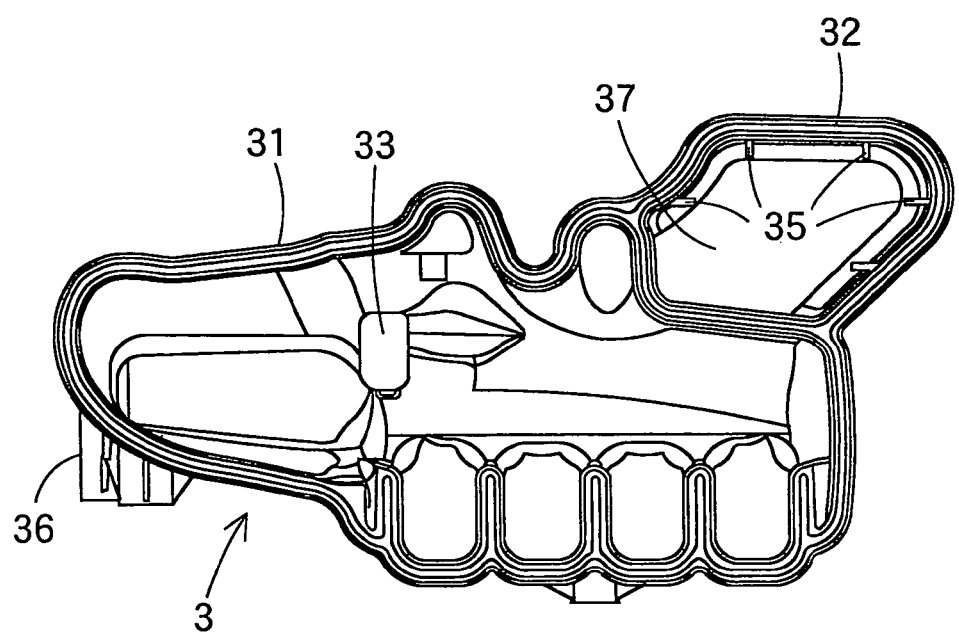
FIG. 11 is a plan view of the tank lower-surface wall and resonator peripheral wall member.
Figure 12:
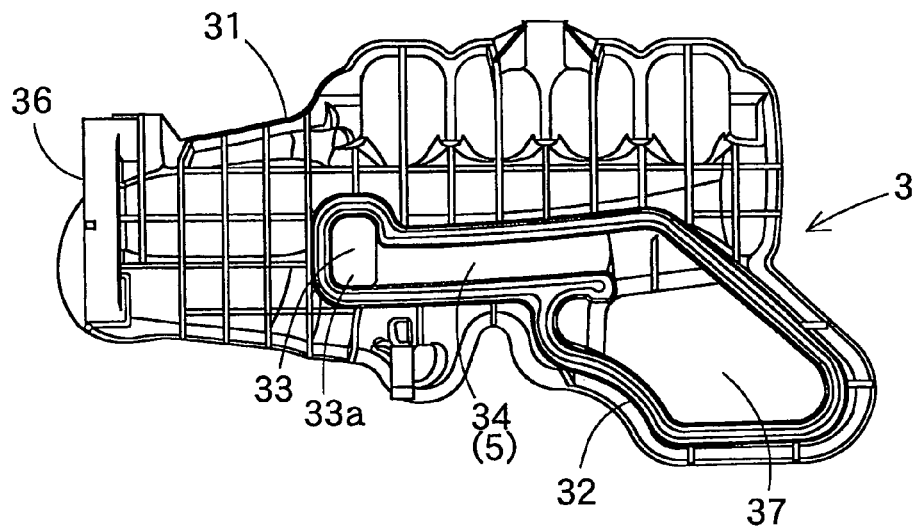
FIG. 12 is a bottom elevational view of the tank lower surface wall and resonator peripheral wall member.
Figure 13:
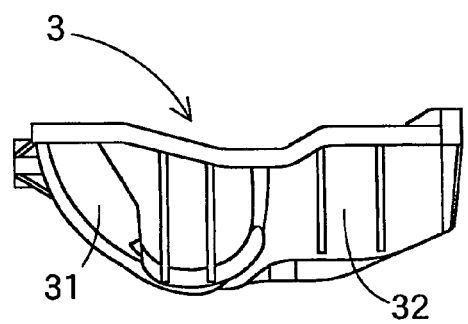
FIG. 13 is a right side elevational view of the tank lower surface wall and resonator peripheral wall member.
Figure 14:
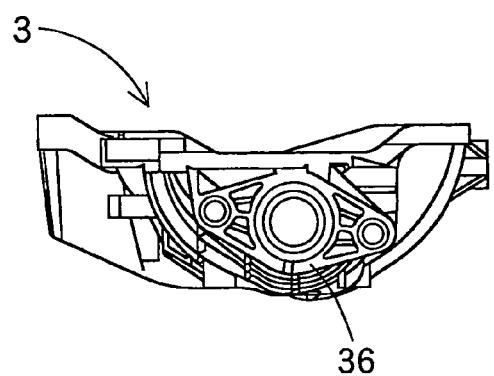
FIG. 14 is a left side elevational view of the tank lower surface wall and resonator peripheral wall member.
Figure 15:
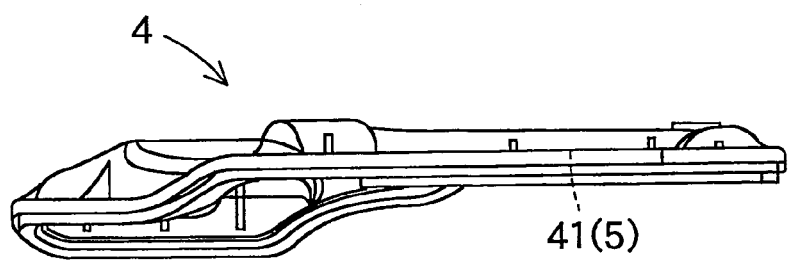
FIG. 15 is a front elevational view of a lower cover member.
Figure 16:
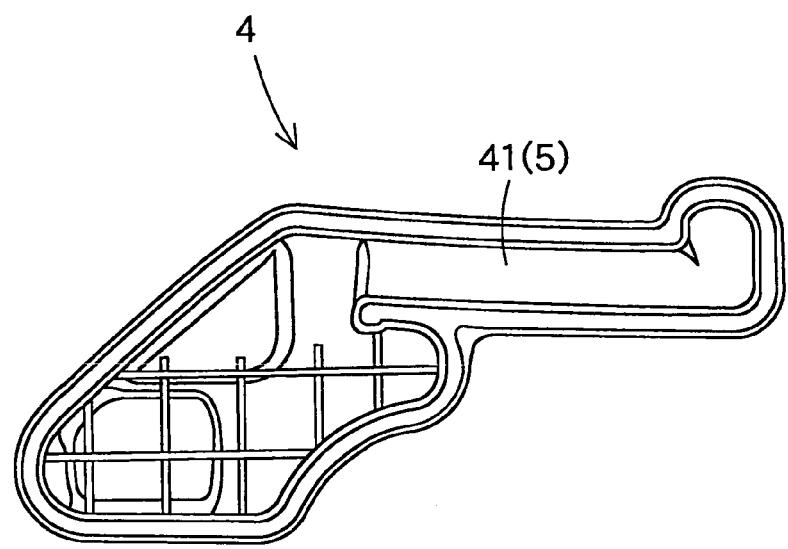
FIG. 16 is a back elevational view of the lower cover member.
Figure 17:
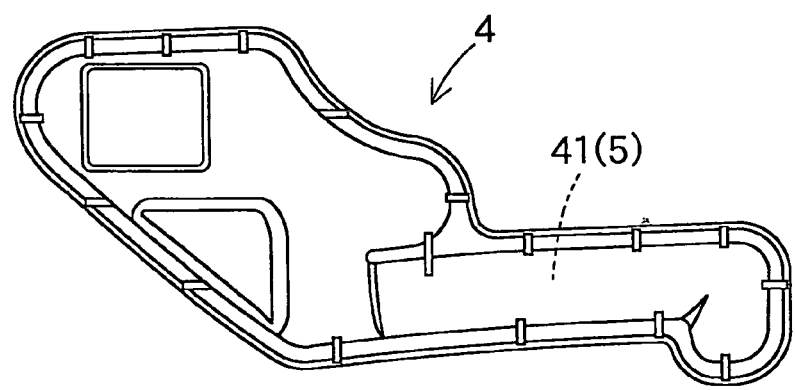
FIG. 17 is a bottom elevational view of the lower cover member.
Figure 18:
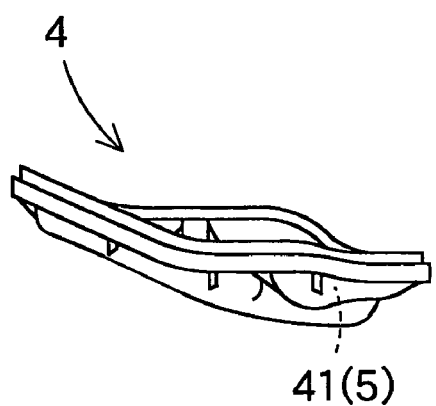
FIG. 18 is a right side elevational view of the lower cover member.
Figure 19:
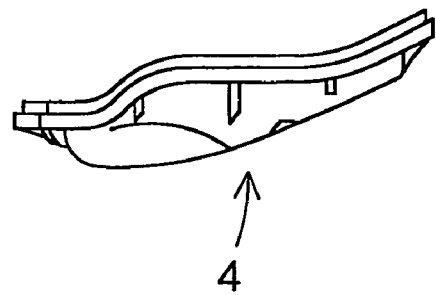
FIG. 19 is a left side elevational view of the lower cover member.

DESCRIPTION OF THE PREFERRED EMBODIMENTS (i) Embodiment of First Aspect of the Present Invention FIGS. 1 to 4 show a resin intake manifold in accordance with an embodiment of a first aspect of the present invention, in which FIG. 1 is a front elevational view, FIG. 2 is a back elevational view, FIG. 3 is a right side elevational view and FIG. 4 is a left side elevational view. FIGS. 5 to 8 show a base member of the intake manifold, in which FIG. 5 is a front elevational view, FIG. 6 is a back elevational view, FIG. 7 is a right side elevational view and FIG. 8 is a left side elevational view. FIGS. 9 to 14 show a tank lower surface wall and resonator peripheral wall member welded to a lower surface side of the base member, in which FIG. 9 is a front elevational view, FIG. 10 is a back elevational view, FIG. 11 is a plan view, FIG. 12 is a bottom elevational view, FIG. 13 is a right side elevational view, and FIG. 14 is a left side elevational view. FIGS. 15 to 19 show a lower cover member welded to a front surface side of the tank lower surface wall and resonator peripheral wall member, in which FIG. 15 is a front elevational view, FIG. 16 is a back elevational view, FIG. 17 is a bottom elevational view, FIG. 18 is a right side elevational view, and FIG. 19 is a left side elevational view. In this case, a front surface and a back surface of the intake manifold are defined on the basis of a state in which the intake manifold is assembled in a cylinder head side of an engine (not shown) and a throttle body, and the side of the cylinder head is defined as the back surface. Further, a front surface, a back surface, a flat surface and a bottom surface of the base member, the upper cover member, the tank lower surface wall and resonator peripheral wall member, and the lower cover member are defined on the basis of a front surface, a back surface, a flat surface and a bottom surface at a time of assembling the intake manifold.

In FIGS. 1 to 4, the resin intake manifold in accordance with the present embodiment is assembled between the throttle body (not shown) and the cylinder head side of the engine, and is structured such as to achieve three functions comprising a surge tank 100 positioned in an upstream side of an intake system, a distribution passage 200 for distributing an intake air from the surge tank 100 to each of the cylinders of the engine, and a resonator 300 communicated with the surge tank 100 and provided for achieving a noise reduction and an output torque increase.

In FIGS. 1 to 19, the resin intake manifold is assembled by welding, for example, in accordance with a vibration welding four members comprising the base member 1, the upper cover member 2, the tank lower surface wall and resonator peripheral wall member 3 and the lower cover member 4, each of which is integrally molded.

The base member 1 has a throttle mounting flange portion 11 firmly fixed to the throttle body in a left end portion. An air intake port 11a taking in the air from an intake passage of the throttle body is formed in the throttle mounting flange portion 11. The air intake port 11a is communicated with the surge tank 100. Further, the base member 1 has an engine mounting flange portion 12 firmly fixed to the cylinder head side in a back surface side. An air discharge port 12a feeding the air to each of the cylinders is formed in the engine mounting portion 12.

The base member 1 has a U-shaped curved distribution passage lower surface wall portion 13 in an upper portion. An upper surface of the distribution passage lower surface wall portion 13 is welded to the upper cover member 2. The upper surface of the distribution passage lower surface wall portion 13 forms a separation passage 13a having a U-shaped cross section and disposed in a lower side of the distribution passage 200 which is separated into two upper and lower pieces, and the lower surface of the upper cover member 2 forms a separation passage 21 having a U-shaped cross section and disposed in an upper side of the distribution passage 200. The distribution passage 200 is formed by welding the upper surface of the distribution passage lower surface wall portion 13 and the upper cover member 2.

Further, the base member 1 has a surge tank peripheral wall portion 14 and a resonator peripheral wall portion 15 in a lower surface side of the distribution passage lower surface wall portion 13. A position of the resonator peripheral wall portion 15 exists between the surge tank peripheral wall portion 14 and the engine mounting flange portion 12, and this space is a portion which is considered as a dead space in the conventional intake manifold. A part 14a of the surge tank peripheral wall portion 14 and a part 15a of the resonator peripheral wall portion 15 structure a common wall portion. A reinforcing rib 16 is formed between an inner peripheral surface of the resonator peripheral wall portion 15 and a lower surface of the distribution passage lower surface wall portion 13. Further, a reinforcing rib 17 is also formed between an outer peripheral surface of the resonator peripheral wall portion 15 and the lower surface of the distribution passage lower surface wall portion 13. An opening portion 14b is extended from en end portion in a front surface side of the surge tank peripheral wall portion 14, and the opening portion 14b structures a communication portion between the surge tank 100 and the distribution passage 200.

The upper cover member 2 has a separation passage 21 having a U-shaped cross section and formed in a lower surface, as mentioned above, and is welded to the upper surface of the base member 1, thereby being integrally formed with the separation passage 13*a* having the U-shaped cross section and formed in the upper surface of the distribution passage lower surface wall portion 13 of the base member 1 so as to form the distribution passage 200.

The tank lower surface wall and resonator peripheral wall member 3 is welded to the surge tank peripheral wall portion 14 of the base member 1 and the lower surface of the resonator peripheral wall portion 15. The tank lower surface wall and resonator peripheral wall member 3 structures a surge tank lower surface wall portion 31 which is depressed to a lower side, and structures a resonator peripheral wall portion 32 penetrating in a vertical direction in continuous with the surge tank lower surface wall portion 31. A long hole 33 in a vertical direction is formed in the surge tank lower surface wall portion 31. A linear groove (an upper distribution passage) 34 connecting the long hole 33 to an inner side of the resonator peripheral wall portion 32 is formed in a bottom surface of the tank lower surface wall and resonator peripheral wall member 3. The groove 34 is formed so as to extend from an upper portion 33*a* of the long hole 33. A reinforcing rib 35 is formed in an inner peripheral surface of the resonator peripheral wall portion 32. An EGR mounting flange portion 36 assembled in an exhaust gas recirculating apparatus (EGR) is formed in a left end portion of the tank lower surface wall and resonator peripheral wall member 3.

The lower cover member 4 is welded to an opening portion 37 in a lower surface side of the tank lower surface wall and resonator peripheral wall member 3. The lower cover member 4 has a linear groove (a lower separation passage) 41 in an upper surface side thereof, and is welded to the opening portion 37 of the tank lower surface wall and resonator peripheral wall member 3, thereby being integrally formed with the upper separation passage 34 of the tank lower surface wall and resonator peripheral wall member 3 so as to form a communication passage 5, that is, a horizontal passage communicating between the surge tank 100 and the resonator 300.

In the resin manifold structured in the manner mentioned above, the intake air fed from the upstream side throttle body enters into the surge tank 100 from the upstream side throttle body, enters into the distribution passage 200 via the opening portion 14*b* of the surge tank peripheral wall portion 14, and is sucked out to the cylinder in the downstream side from the air discharge port 12*a* of the engine mounting flange portion 12. The resonator 300 carries out a noise reduction of the intake air and an increase of an output torque.

As described above, the resin intake manifold in accordance with the present embodiment is the resin intake manifold provided with the integrally formed base member having the U-shaped curved distribution passage lower surface wall portion 13, the engine mounting flange portion 12 formed in one end of the distribution passage lower surface wall portion 13, and the surge tank peripheral wall portion 14 formed in another end and lower surface side of the distribution passage lower surface wall portion 13, and is structured by integrally forming the resonator peripheral wall portion 15 in the dead space between the surge tank peripheral wall portion 14 and the engine mounting flange portion 12 in the lower surface side of the distribution passage lower surface wall portion 13.

In accordance with the resin intake manifold of the present embodiment, since the resonator peripheral wall portion 15 is integrally formed in the dead space between the surge tank peripheral wall portion 14 and the engine mounting flange portion 12, it is possible to effectively utilize the space without generating any enlarged scale of the base member 1, and further, since the resonator peripheral wall portion 15 is integrally formed in the lower surface of the distribution passage lower surface wall portion 13, it is possible to improve a strength of the distribution passage lower surface wall portion 13, in other words, a strength of the base member 1.

Further, since the part 15*a* of the resonator peripheral wall portion 15 and the part 14*a* of the surge tank peripheral wall portion 14 form a common wall portion, the other wall portions than the common wall portions 14*a* and 15*a* in the resonator peripheral wall portion 15 function as a reinforcing structure of the surge tank peripheral wall portion 14, and it is possible to improve a strength of the surge tank peripheral wall portion 14 in addition to the distribution passage lower surface wall portion 13.

Further, the resin intake manifold in accordance with the present embodiment is provided with the tank lower surface wall and resonator peripheral wall member 3 welded to the lower surface side of the base member 1, and the lower cover member 4 welded to the opening portion 37 in the lower surface side of the tank lower surface wall and resonator peripheral wall member 3, the tank lower surface wall and resonator peripheral wall member 3 and the lower cover member 4 have respective separation passages 13*a* and 34, and the communication passage 5 communicating between the resonator 300 and the surge tank 100 is formed by the combination of both the separation passages 13*a* and 34. Since the communication passage 5 is formed by combining two members comprising the tank lower surface wall and resonator peripheral wall member 3 and the lower cover member 4, it is unnecessary to use the slide core or the like and it is extremely easy to carry out a work for forming the communication passage, in comparison with the case that the communication passage is formed only by one member.

Further, since the long hole 33 in the vertical direction is provided in the opening end of the communication passage 5 in the side of the surge tank, and the communication passage 5 is communicated with the upper portion of the long hole 33, it is possible to receive a dew condensation within the surge tank 100 or within the resonator 300 by the lower portion of the long hole 33 so as to keep the communication state between the upper portion 33*a* of the long hole 33 and the communication passage 5, at a time of being used in a cold district or the like, it is possible to maintain the communication state between the surge tank 100 and the resonator 300, and it is possible to maintain a function (a noise reduction and an output torque increase) of the resonator 300.

In this case, in the embodiment mentioned above, the part 14*a* of the surge tank peripheral wall portion 14 and the part 15*a* of the resonator peripheral wall portion 15 are formed as the common wall portion, however, the surge tank peripheral wall portion 14 and the resonator peripheral wall portion 15 may be structured such as to have no common wall portion.

(ii) Embodiment of Second Aspect of the Present Invention

In the conventional resin intake manifold, as shown in FIG. 20, the cross sectional shape is formed in an approximately rectangular shape in the cutting surface in which a plurality of branch pipes 50 and a surge tank 51 appear. Further, the intake manifold is formed a three-piece separated structure so as to have a first separation surface 50*a* vertically separating the branch pipe 50 into two pieces, and a second separated surface 51*a* separating the surge tank 51 into two pieces, and the respective separation surfaces 50a and 51a are bonded in accordance with a vibration welding. In other words, in a cross section shown in FIG. 20, a line connecting respective center positions of a plurality of branch pipes 50 is formed in a linear shape, and a shape of an inner wall portion 51b of the surge tank 51 forming an opposite surface to the branch pipe 50 with respect to the second separation surface 51a in the surge tank 51 is formed in an approximately linear shape (refer to Japanese Unexamined Patent Publication No. 2000-179419 (pages 2 to 3 and FIG. 3)).

However, for example, in the case that an explosion is generated in the intake side of the engine, that is, a so-called back fire is generated, the pressure within the intake manifold is rapidly increased, and a high internal pressure is applied particularly to an inner peripheral wall surface of the surge tank 51. Since the internal pressure is applied as a force intending to expand the upper and lower inner wall surfaces 51b and 51c of the surge tank 51, as shown in FIG. 20, the force deforms the surge tank 51 so as to expand in a vertical direction. The deformation applies a stress concentration to the first separation surface 50a and the second separation surface 51a (mainly to the second separation surface 51a). For example, as shown in FIG. 21, a bending moment is applied to the second separation surface 51a from an inner side of the surge tank 51, and the bending moment appears as a bending stress having a supporting point set to a welded portion 51f bonding respective weld flange portions 51d and 51e, in the weld portion 51f, and is applied so as to open the second separation surface 51a from the inner side. Accordingly, the force lowers the pressure resisting strength of the weld portion 51f.

An object of the second aspect of the present invention is to provide a resin intake manifold which can solve the problems mentioned above, makes the stress applied to the weld portion 51f small, and does not lower the pressure resisting strength.

A resin intake manifold (hereinafter, refer to as an intake manifold) in accordance with the embodiment is, as shown in FIGS. 22 to 25, provided with a throttle side mounting flange portion 52 arranged in a side of a throttle body (not shown) in one side, and an engine side mounting flange portion 53 connected to a cylinder head of an engine (not shown) in another side, and is structured such that a surge tank 54 connected to the throttle side mounting flange portion 52, and a plurality of (four in an illustrated embodiment) branch pipes 55 (55A, 55B, 55C and 55D in sequence from the side of the throttle side mounting flange portion 52) connected to the engine side mounting flange portion 53 are provided between the throttle side mounting flange portion 52 and the engine side mounting flange portion 53. In this case, in the following description, a part showing an air passage 551 of the branch pipe 55 is set to an upper portion, and a part showing a resonator 56 is set to a lower portion, in the cross section shown in FIG. 24.

As shown in FIG. 22, an air intake port 521 is formed in the throttle side mounting flange portion 52, and an air passage 522 is connected to an inner side of a surge tank 54.

As shown in FIG. 25, each of the branch pipes 55 is arranged so as to be connected to the surge tank 54 in a state of having a discharge port 552 connected to the engine side mounting flange portion 53 in one end, and having a suction port 553 making an intrusion into the surge tank 54 in another end, and the air passage 551 is formed between the discharge port 552 and the intake port 553.

As shown in FIG. 24, the surge tank 54 forms a first separation surface 57 separating a plurality of branch pipes 55 in a vertical direction, and a second separation surface 58 separating the branch pipes 55 of the surge tank 54 in a vertical direction by center positions in a parallel arranging direction, in a cut surface including the air passage 551 of the branch pipe 55, thereby separating the branch pipe into an upper piece 59, a center piece 60 and a lower piece 61 in sequence from the upper side. Further, the branch pipe is bonded in accordance with a vibration welding in a position of the first separation surface 57 in the upper piece 59 and the center piece 60, and a position of the second separation surface 58 in the center piece 60 and the lower piece 61.

Further, in FIG. 24, the center position of the air passage 551 in each of the branch pipes 55 is arranged in a curves shape so as to make a center position of the air passage 551 of the inner branch pipe 55 (55B and 55C) higher, and an inner wall portion 54a forming an opposite surface to the branch pipe 55 in the surge tank 54 with respect to the second branch surface 58 is formed in a curved shape in which a center portion is expanded. Accordingly, a cross sectional shape of the surge tank 54 including the air passage 551 of the branch pipe 55 is formed in an approximately oval shape in which the parallel arranging direction of the branch pipe 55 is a long circle. It is desirable that the approximately oval cross sectional shape is a spherical shape for improving the pressure resisting strength, however, is appropriately set such as to prevent the outer wall portion of the branch pipe 55 from protruding to an outer side too much so as to take too much space around the intake manifold.

Further, the lengths from the intake ports 553 of the respective branch pipes 55 to the discharge ports 552 are all formed to be an equal length. In other words, since the branch pipes 55A and 55D arranged in the outer side are largely curved in the parallel arranging direction of the branch pipe in the plan view, that is, in a lateral direction in FIG. 22, the length thereof in the plan view is formed to be longer than that of the inner branch pipes 55B and 55C. However, since the branch pies 55B and 55C arranged in the inner side are formed so as to be higher than that of the outer branch pipes 55A and 55D in the height direction, as shown in FIG. 24, the length thereof in the plan view is formed longer. Accordingly, at a time of arranging the height of the center position of the air passage 551 in the respective branch pipes 55 in the curved shape, the respective branch pipes 55 are formed by setting the height of the branch pipes 55 in the plan view such that entire lengths of all the branch pipes 55 are equal.

Weld flange portions 59a and 60a are respectively formed in a bonded surface between the upper piece 59 and the center piece 60 in such a manner as to protrude from end portions of the upper piece 59 and the center piece 60 around an entire periphery. Further, weld flange portions 60b and 61a are respectively formed in a bonded surface between the center piece 60 and the lower piece 61 in such a manner as to protrude from end portions of the center piece 60 and the lower piece 61 around an entire periphery.

Weld portions 57a and 58a having a predetermined width are respectively formed in the weld flange portion 59a and the weld flange portion 60a in the first separation surface 57, and the weld flange portion 60b and the weld flange portion 61a in the second separation surface 58, and are bonded in accordance with a vibration welding.

The weld portions 57a and 58a are bonded by aligning opposing surfaces of the weld flange portion 59a and the weld flange portion 60a, and opposing surfaces of the weld flange portion 60b and the weld flange portion 61a, and thereafter applying a lateral vibration and generating a frictional heat so as to weld. The lateral vibration is generated by a vibration welding jig, and the lateral vibration is applied by pressure welding the vibration welding jig so as to clamp the overlapped weld flange portion 59a and weld flange portion 60a, and the weld flange portion 60b and the weld flange portion 61b from both sides.

In this case, in the intake manifold in accordance with the embodiment, a resonator 56 for a noise reduction is arranged in a lower portion of the surge tank 54, at a position corresponding to a dead space with respect to the engine side mounting flange 53. The resonator 56 is structured such that a cover 561 protruding to a lower side from an inner wall portion 54a formed in the lower portion of the surge tank 54 is formed by bonding the respective weld flange portions 61b and 561a in accordance with a vibration welding, and a space portion 562 is provided between the inner wall portion 54a of the surge tank 54 and the cover 561. The surge tank 54 and the resonator 56 are communicated by the communication hole 54b formed in the inner wall portion 54a of the surge tank 54.

Next, a description will be given of an operation of an air flow passing through the intake manifold structured as mentioned above.

The intake manifold is arranged between the throttle body and the engine by attaching the throttle side mounting flange 52 to the throttle body (not shown) and attaching the engine side mounting flange 53 to the cylinder head of the engine (not shown).

The air fed from the throttle side is supplied into the surge tank 54 through the air passage, and is fed to each of the cylinders of the engine from the surge tank 54 through an intake port 553, an air passage 551 and a discharge port 552 in each of the branch pipes 55.

At this time, when the explosion is generated in the intake side of the engine, that is, the back fire is generated, a positive pressure is applied to the inner side of the surge tank 54 and the inner side of the air passage 551 within the branch pipe 55, so that the pressure is rapidly increased. The pressure presses the inner peripheral wall surface of the surge tank 54, and the inner peripheral wall surface of the branch pipe 55, as shown by an arrow in FIG. 24. Since the high pressure is mainly applied such as to expand the inner wall portion 54a of the surge tank 54 and the inner wall portion 54c in the side of the branch pipe 55, the bending moment is applied to the second separation surface 58 separating the surge tank 54 from an inner side, so that a stress concentration is applied.

However, since the inner wall portions 54a and 54c of the surge tank 54 are previously formed in the approximately oval cross sectional shape which is formed in the case of being deformed by the internal pressure, the bending moment applied to the second separation surface 58 can be omitted due to the deformation in the internal pressure applied to the inner wall portions 54a and 54c of the surge tank 54, whereby the stress concentration applied to the second separation surface 58 is reduced.

As mentioned above, in accordance with the intake manifold of the embodiment, the following effects can be achieved.

In other words, in the cut surface obtained by cutting the surge tank 54, since the cut surface of the surge tank 54 is formed in the approximately oval shape by arranging the center position of the air passage 551 in the inner branch pipes 55B and 55C in the curved shape so as to be higher than the position of the outer branch pipes 55A and 55D, in a plurality of branch pipes 55, and forming the inner wall portion 54a of the surge tank 54 formed in the opposite side to the branch pipe 55 with respect to the second separation surface 58 in the curved shape, it is possible to reduce the stress concentration applied to the second separation surface 58 even in the case that the high pressure is applied to the inner side of the surge tank 54, and the second separation surface 58 can be formed as the pressure resisting structure by making the bending stress around the weld portion 58a corresponding to the supporting point small.

Accordingly, since the vibration welding can be applied without making the wall portion of the surge tank 54 thick so as to increase the weight thereof, and lowering the welding efficiency at a time of welding by the welding jig, it is possible to improve a welding strength without making a cost high.

Further, since the center position of the air passage 551 in the inner branch pipes 55B and 55C is set to the higher position than that of the outer branch pipes 55A and 55D, the outer branch pipes 55A and 55D are formed so as to be largely curved in a lateral direction in a plan view. Accordingly, since it is possible to make the length of the branch pipe in the height direction longer at an increase of the entire length, it is possible to make the entire lengths of all the branch pipes 55 equal. Therefore, since it is possible to intend to achieve the pressure resisting structure and the equal length of the branch pipe without adding any new structure, it is possible to reduce the cost.

In this case, the resin intake manifold in accordance with the present invention is not limited to the embodiment mentioned above. For example, the resin intake manifold may be formed by being separated into three pieces, or may be integrally formed in accordance with a lost wax method or the like without being separated.

Further, the intake manifold may be structured without the resonator 56 arranged in the lower side of the surge tank 54.

Further, since the branch pipe 55 can be arranged in the curved shape as far as three or more branch pipes 55 are arranged, the present invention can be preferably used even in the case that the number of the branch pipes 55 is not four as in the embodiment.

(iii) Embodiment of Third Aspect of the Present Invention

A description will be given of the present embodiment by exemplifying an intake manifold for a multi point (each cylinder independent) injection (MPI) in a four-cylinder engine. However, the present invention is not limited to this, and can be, of course, applied to an MPI intake manifold for a multi-cylinder engine having six cylinders, eight cylinders and the like.

In this case, in the following description, a front surface and a back surface of the intake manifold are set such that a side of the cylinder head is the back surface, and on the basis of a state in which the intake manifold is assembled in the cylinder head side of the engine (not shown) and the throttle body.

In FIGS. 26 to 32, the intake manifold in accordance with the present embodiment is basically provided with a surge tank (a collector portion) 60 dividing the intake air introduced from the throttle into the respective cylinders, an intake pipe 61 connecting to the respective cylinders therefrom, and amounting flange portion 62 connecting to the cylinder head. In the present embodiment, a resonator 63 is assembled in view of a space saving, although it is not inevitable.

Further, mainly for the reason of molding, the intake manifold in accordance with the present embodiment is structured such that substantially three piece bodies comprising a base member (a core member) 64, an intake pipe forming member 65 and a tank forming member 66 are integrally formed by peripheral surfaces or the like in accordance with a vibration welding (a friction welding).

Specifically, the base member 64 structures a base portion of the intake pipe, a lower side of the intake pipe, a ceiling portion of the surge tank, and a ceiling portion of the resonator, and is provided with the mounting flange portion 62 in a side of the cylinder head, and a connection flange portion 67 in a side of the throttle (an intake side).

Five bolt holes 68 to which metal bushes 68 are fitted are provided between both right and left end portions of the mounting flange portion 62 and the respective intake pipes 61.

The tank forming member 66 structures a main body of the surge tank and a main body of the resonator, and in order to form a communication passage 69 between the resonator 63 and the surge tank 60, separated bodies of a main body 66a and a cover body 66b are integrally formed by peripheral surfaces of the like in accordance with a friction welding such as a vibration welding or the like.

In the structure mentioned above, in accordance with the present embodiment, in the case that the intake pipes are set to first, second, third and fourth intake pipes 61a, 61b, 61c and 61d from the side of the throttle (the intake side), first and second rib pairs 70A and 70B are respectively formed between the second and third intake pipes 61b and 61c and between the third and fourth intake pipes 61c and 61d so as to have an enough gap S (S1 and S2) between a pair of ribs to prevent a screw member such as a nut, a bolt or the like from falling off.

In this case, the gaps S1 and S2 between a pair of ribs are not particularly limited as far as the gap prevents the screw member from falling off. For example, in the case of an M8 hexagon cap nut, since a nut height is normally between 7 and 8 mm, for example, the gap may be set to be equal to or less than about 7 mm. Further, a minimum value of the gap S between a pair of ribs is equal to or more than 1 mm in view of a drainage property and a molding property, and is desirably equal to or more than 3 mm. In the case that the gap is less than 1 mm, the drainage property is lowered, and it is necessary to form a thin diluting protrusion portion (which is easily broken) for forming the gap in the metal mold.

Further, the gap S1 between a pair of ribs formed in the first rib pair 70A is formed from the mounting flange portion 62 toward the intake pipe 61, as shown in FIGS. 29 and 30, and the terminal end wall of the gap S1 between a pair of ribs is formed so as to be inclined at the same angle as the die cutting direction of the female mold, that is, the incline of an outer wall surface (an intake pipe wall connecting wall) 64a of the base member 64. In other words, in order not to interfere with the die cutting at a time of mold forming, a short of an undercut is structured.

Further, the gap S2 between a pair of ribs formed in the second rib pair 70B is formed from the mounting flange portion 62 toward the intake pipe 61, as shown in FIGS. 31 and 32, and formed so as to be extended to the portion exceeding the thickness of rib pair 70B. In other words, in order not to interfere with the die cutting at a time of mold forming, a short of an undercut is structured.

Further, the first rib pair 70A is formed in a curved shape or a taper shape in a cross section (refer to FIG. 26A) such that a rain wafer smoothly flows down toward the gap S1 between a pair of ribs. In this case, in forming in the taper shape, an angle thereof is set between 30 and 60 degree with respect to an axial surface of the gap. In this case, the second rib pair 70B is not formed in the curved shape or the taper shape as a matter of convenience of design, in the illustrated embodiment, however, as a matter of course, such a structure may be employed.

A portion between the first and second intake pipes 61a and 61b is not provided with a rib pair for passing a wire harness or the like therethrough but is formed as an entirely open hole 71, in the present embodiment. In the case that a wiring member is not inserted between the first and second intake pipes 61a and 61b, the same rib pair as that between the second and third intake pipes and between the second and third intake pipes may be provided.

Next, a description will be given of a method of forming the resonator having the structure mentioned above.

Basically, the base member 64, the intake pipe forming member 65, and the tank forming member 66 (the main body 66a and the cover body 66b) are manufactured by injection molding a thermoplastic resin reinforced by an inorganic fiber such as a glass fiber or the like by using a nylon 6, a nylon 66 or the like as a molding material. In this case, the molding material is not limited to the nylon 6 or the nylon 66, and is not particularly limited to the thermoplastic resin and a thermosetting resin as far as the resin has a mineral oil resistance and a heat resistance.

In this case, since the base member 64 is provided with the rib pair for preventing the nut from falling off, a description will be in detail given below of the case of forming the base member 64.

FIGS. 30 and 32 are respectively partial cross sectional views corresponding to a portion along a line XXX—XXX in FIG. 28 and a portion along a line XXXII—XXXII in FIG. 28. In this case, thick arrows in the metal mold cross sectional views in FIGS. 30 and 32 respectively show die cutting directions.

The mold is basically constituted by an upper mold (a stationary mold: a female mold) 72 and a lower mold (a movable mold: a male mold) 73, and a slide core 74 for forming the mounting flange portion is assembled in the upper mold 72. Further, the upper mold 72 is provided with a diluting convex groove 75 and a plate-shaped diluting projection 75A for diluting the gap between a pair of ribs.

Further, in a mold closed state, an injection material (for example, the nylon 6 with glass fiber) from an injection molding machine is poured into a product cavity 76 from three points in respective gates (G1, G2 and G3 in FIG. 28) via a sprue runner.

Further, after cooling and solidifying, a mold opening is carried out. In this case, since each of the gaps S1 and S2 between a pair of ribs are formed as the structure which is short of undercut, the molded product (the base member) is protruded by an ejector pin (not shown) by backward moving the slide core 74 in a direction of an arrow and thereafter backward moving the lower mold in a direction of an arrow.

At this time, since the respective diluting protrusions (projections) 75 and 75A for forming the respective gaps between a pair of ribs provided in the upper mold 72 are formed as the structure which is short of undercut, at a time of backward moving the lower mold 73, the mold opening and the mold releasing can be carried out without interfering with the base member corresponding to the solidified molded product.

Next, each of the pieces manufactured in the manner mentioned above is attached to an actual vehicle by integrally forming in accordance with the vibration welding, press fitting the metal member such as a bush 68a or the like as occasion demands, and assembling a gasket 77 (refer to FIG. 27).

Further, the intake manifold is mounted to a cylinder head 78 by inserting a stud bolt 79 protruding from a head seat surface of the cylinder head 78 to a bolt hole 68 in the mounting flange 62 of the intake manifold and thereafter fastening a hexagon cap nut 80 to the stud bolt 79.

At this time, there is no risk that the nut falls off between the second and third intake pipes 61b and 61c in which the far side of the intake pipe 61 is the mounting position, and the cylinder head mounting operability of the intake manifold is improved.

Further, after attaching to the actual vehicle, even in the case that the rain water or the like flows down from the upper surface of the intake manifold, the water is smoothly discharged through the gaps S1 and S2 between a pair of ribs between the second and third intake pipes 61b and 61c and between the third and fourth intake pipes 61c and 61d as well as between the first and second intake pipes 61a and 61b of the entirely open hole 71, and no water is reserved between the rib pairs.

Accordingly, even in the case that the intake manifold is made of a resin having a high amide group concentration and a high water absorption such as the nylon 6, the nylon 66 or the like, there is lowered a risk that the hygroscopic swelling is generated, and the stress crack is generated due to the staying of the snow melting agent solution such as the calcium chloride or the like.

The invention claimed is:

1. A resin intake manifold comprising:
   an integrally formed base member having a U-shaped curved distribution passage lower surface wall portion, an engine mounting flange portion formed in one end of said distribution passage lower surface wall portion, and a surge tank peripheral wall portion formed in another end and a lower surface side of said distribution passage lower surface wall portion, wherein a resonator peripheral wall portion is integrally formed in a dead space in a lower surface side of said distribution passage lower surface wall portion and between said surge tank peripheral wall portion and said engine mounting flange portion, wherein the resonator is provided as a structure body in the dead space between the surge tank and the engine mounting flange.

2. A resin intake manifold comprising:
   an integrally formed base member having a U-shaped curved distribution passage lower surface wall portion, an engine mounting flange portion formed in one end of said distribution passage lower surface wall portion, and a surge tank peripheral wall portion formed in another end and a lower surface side of said distribution passage lower surface wall portion, wherein a resonator peripheral wall portion is integrally formed in a dead space in a lower surface side of said distribution passage lower surface wall portion and between said surge tank peripheral wall portion and said engine mounting flange portion.

3. A resin intake manifold as claimed in claim 2, wherein a part of said resonator peripheral wall portion and a part of said surge tank peripheral wall portion form a common wall portion.

4. A resin intake manifold as claimed in claim 2 or 3, wherein the resin intake manifold is provided with a tank lower surface wall and resonator peripheral wall member welded to a lower surface side of said base member, and a lower cover member welded to an opening portion in a lower surface side of said tank lower surface and resonator peripheral wall member, said tank lower surface wall and resonator peripheral wall member and said lower cover member have respective separation passages, and a communication passage communicating between the resonator and the surge tank is formed by a combination of both the separation passages.

5. A resin intake manifold as claimed in claim 4, wherein a long hole in a vertical direction is provided in an opening end of said communication passage in a side of the surge tank, and said communication passage is communicated with an upper portion of said long hole.

6. A resin intake manifold provided with a surge tank arranged between a throttle body and an engine and reserving an air, and a plurality of branch pipes including end branch pipes and inner branch pipes disposed between the end branch pipes and each having a discharge port connected to each of cylinders of an engine in one end and forming an air passage, and distributing the air to each of the cylinders of said engine, wherein air passage center positions of a plurality of branch pipes are arranged in a curved shape so as to make the air passage center positions of the inner branch pipes higher from a cut surface passing through said surge tank relative to the air passage center positions of the end branch pipes, and a wall portion of said surge tank in an opposite surface to said branch pipes with respect to said surge tank is formed in a curved shape expanded in a center portion, the resin intake manifold including an upper piece, a center piece and a lower piece, the upper piece and the center piece being connected together to define at least in part the plurality of branch pipes and the center piece and the lower piece being connected together to define at least in part the surge tank with the center piece being connected to and between the upper and lower pieces.

7. A resin intake manifold provided with a surge tank arranged between a throttle body and an engine and reserving an air, and a plurality of branch pipes including end branch pipes and inner branch pipes disposed between the end branch pipes and each having a discharge port connected to each of cylinders of an engine in one end and forming an air passage, and distributing the air to each of the cylinders of said engine, wherein air passage center positions of a plurality of branch pipes are arranged in a curved shape so as to make the air passage center positions of the inner branch pipes higher from a cut surface passing through said surge tank relative to the air passage center positions of the end branch pipes, and a wall portion of said surge tank in an opposite surface to said branch pipes with respect to said surge tank is formed in a curved shape expanded in a center portion,
   wherein the surge tank is formed by three pieces separated by a separation part separating along a parallel arranging direction of said branch pipes in said surge tank and a separation part separating said branch pipes along the parallel arranging direction of said branch pipes, in a cut surface cutting a plurality of branch pipes and the surge tank in said resin intake manifold, and is bonded in the respective separation parts in accordance with a vibration welding.

8. A resin intake manifold provided with a surge tank portion, an even number of intake pipes branched from said surge tank portion so as to be connected to respective cylinders, and mounting flange portions formed in leading end portions of said intake pipes and connected to a cylinder head, wherein a connection between said mounting flange portions and said cylinder head is achieved by a screw connection, said mounting flange portions are provided with bolt holes, and a pair of ribs having a gap between a pair of ribs so as to prevent said screw member from falling off are formed between opposing walls of said intake pipes.

9. A resin intake manifold as claimed in claim 8, wherein the bolt holes provided in said mounting flange portions are arranged on a diagonal line with respect to the respective cylinder holes of the cylinder head, and a pair of ribs are formed between the opposing walls of the intake pipe in which the screw fastening is at a far side position.

10. A resin intake manifold as claimed in claim 8, wherein said gap between a pair of ribs is formed from the mounting flange portion toward said intake pipe and at least a terminal end wall of said gap between a pair of ribs is formed so as to be inclined in a die cutting direction of a female mold or so as to be over a back surface wall of said ribs.

11. A resin intake manifold as claimed in claims 8, 9 or 10, wherein a top surface of said rib for preventing the nut from falling off is formed in a shape corresponding to a water stream guide surface for guiding a water stream to said gap between a pair of ribs.

12. A resin intake manifold as claimed in claim 8, wherein said synthetic resin is constituted by a polyamide in which an amide group density reinforced by an inorganic fiber is equal to or more than an approximately polyamide 6.

13. A method of manufacturing a resin intake manifold as claimed in claim 10, wherein the resin intake manifold is formed by using an injection molding metal mold having a female mold provided with a protrusion and/or a plate-shaped projection capable of diluting said gap between a pair of ribs.

14. A resin intake manifold provided with a surge tank arranged between a throttle body and an engine and reserving an air, and a plurality of branch pipes including end branch pipes and inner branch pipes disposed between the end branch pipes and each having a discharge port connected to each cylinder of an engine in one end and forming an air passage, and distributing the air to each of the cylinders of said engine, wherein the resin intake manifold including an upper piece defining partial portions of each one of the plurality of branch pipes, a center piece defining remaining partial portions of each one of the plurality of branch pipes and a lower piece, the upper piece and the center piece being connected together to define at least in part the plurality of branch pipes and the center piece and the lower piece being connected together to define at least in part the surge tank with the center piece being connected to and between the upper and lower pieces, the lower piece having a curved inner wall portion disposed opposite to and extending generally away from the plurality of branch pipes, the plurality of branch pipes arranged in a stepped-apart manner relative to one another, the curved inner wall portion and the arrangement of the plurality of branch pipes defining an expanded central surge tank portion of the surge tank as generally viewed centrally of the surge tank between the curved inner wall portion and the plurality of branch pipes.

15. A resin intake manifold provided with a surge tank arranged between a throttle body and an engine and reserving an air, and a plurality of branch pipes including end branch pipes and inner branch pipes disposed between the end branch pipes and each having a discharge port connected to each cylinder of an engine in one end and forming an air passage, and distributing the air to each of the cylinders of said engine, wherein the surge tank is formed by three pieces separated by a separation part separating along a parallel arranging direction of said branch pipes in said surge tank and a separation part separating said branch pipes along the parallel arranging direction of said branch pipes, in a cut surface cutting a plurality of branch pipes and the surge tank in said resin intake manifold, and is bonded in the respective separation parts in accordance with a vibration welding and wherein the resin intake manifold includes an upper piece defining partial portions of each one of the plurality of branch pipes, a center piece defining remaining partial portions of each one of the plurality of branch pipes and a lower piece, the upper piece and the center piece being connected together to define at least in part the plurality of branch pipes and the center piece and the lower piece being connected together to define at least in part the surge tank with the center piece being connected to and between the upper and lower pieces, the lower piece having a curved inner wall portion disposed opposite to and extending generally away from the plurality of branch pipes, the plurality of branch pipes arranged in a stepped-apart manner relative to one another, the curved inner wall portion and the arrangement of the plurality of branch pipes defining an expanded central surge tank portion of the surge tank as generally viewed centrally of the surge tank between the curved inner wall portion and the plurality of branch pipes.

* * * * *